(12) United States Patent
Kim

(10) Patent No.: US 11,422,665 B2
(45) Date of Patent: Aug. 23, 2022

(54) TOUCH DISPLAY DEVICE

(71) Applicant: LG Display Co., Ltd., Seoul (KR)

(72) Inventor: CheolSe Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/499,737

(22) Filed: Oct. 12, 2021

(65) Prior Publication Data
US 2022/0206638 A1 Jun. 30, 2022

(30) Foreign Application Priority Data

Dec. 29, 2020 (KR) .......................... 10-2020-0186164

(51) Int. Cl.
*G06F 3/044* (2006.01)
*G06F 3/041* (2006.01)

(52) U.S. Cl.
CPC .......... *G06F 3/0446* (2019.05); *G06F 3/0448* (2019.05); *G06F 3/04164* (2019.05); *G06F 2203/04111* (2013.01); *G06F 2203/04112* (2013.01)

(58) Field of Classification Search
CPC .. G06F 3/0446; G06F 3/04164; G06F 3/0448; G06F 2203/04111; G06F 2203/04112
USPC ........................................................... 345/174
See application file for complete search history.

(56) References Cited

U.S. PATENT DOCUMENTS

2013/0168221 A1* 7/2013 Xie ....................... G06F 3/0446
200/600

FOREIGN PATENT DOCUMENTS

CN 103389819 A * 11/2013

* cited by examiner

*Primary Examiner* — Mark Edwards
(74) *Attorney, Agent, or Firm* — Fenwick & West LLP

(57) ABSTRACT

Embodiments of the present disclosure relate to touch display devices, and more particularly, to a touch display device capable of reducing the number of touch lines and touch channels through a structure in which touch electrodes are arranged in diagonal directions.

20 Claims, 14 Drawing Sheets

TE List

* TE_A = A1+A2+A3+A4
* TE_B = B1+B2+B3+B4
* TE_C = C1+C2+C3+C4
* TE_D = D1+D2+D3+D4
* TE_E = E1+E2+E3+E4
* TE_F = F1+F2+F3+F4

* TE_G = G1+G2
* TE_H = H1+H2
* TE_I = I1+I2
* TE_J = J1+J2

* TE_a = a1+a2+a3+a4
* TE_b = b1+b2+b3+b4
* TE_c = c1+c2+c3+c4
* TE_d = d1+d2+d3+d4
* TE_e = e1+e2+e3+e4
* TE_f = f1+f2+f3+f4

* TE_g = g1+g2
* TE_h = h1+h2
* TE_i = i1+i2
* TE_j = j1+j2

TOUCH DISPLAY DEVICE

CROSS-REFERENCE TO RELATED APPLICATION

This application claims the priority benefit of Korea Patent Application No. 10-2020-0186164, filed on Dec. 29, 2020 in the Korean Intellectual Property Office, the disclosure of which is incorporated herein by reference in its entirety.

BACKGROUND

Field of the Disclosure

The present disclosure relates to touch display devices.

Description of the Background

Touch display devices increasingly employ a touch-based input function that enables users to easily input information or a command to the display device in an intuitive and convenient manner, in addition to a function of displaying images or data.

In order to provide the touch-based input function, the touch display device is required to have a capability to accurately detect the presence or absence of a touch from a user and detect a coordinate of the touch. To do this, the touch display device includes a touch panel having a touch sensor structure. Here, the touch sensor structure may include a plurality of touch electrodes and a plurality of touch lines.

When the size of the touch panel increases, increase in the number of touch electrodes is needed. As a result, the number of touch lines disposed on the touch panel increases, and the number of touch channels (corresponding to the touch lines) of the touch driving circuit is also required to be increased. This results in panel manufacturing being more complicated and manufacturing cost increasing, and in turn, an associated touch driving circuit may be more complicated and the cost of manufacturing the touch driving circuit may increase more.

SUMMARY

Embodiments of the present disclosure provide touch display devices having a touch sensor structure capable of reducing the number of touch lines and touch channels.

Embodiments of the present disclosure provide touch display devices having a touch sensor structure capable of improving transmittance of a display panel by reducing the number of touch electrodes when a touch panel is embedded in the display panel.

Embodiments of the present disclosure provide touch display devices capable of displaying uniform images by enabling a substantial equal parasitic capacitance to be formed through a gate line or a data line for each touch electrode.

According to aspects of present disclosure, a touch display device is provided that includes a substrate, a pad portion disposed in an edge of the substrate, a plurality of unit electrodes arranged in a matrix form, and a plurality of touch lines electrically connecting one or more of the plurality of unit electrodes to the pad portion.

The plurality of unit electrodes are connected to form a plurality of first touch electrodes disposed in a first diagonal direction and a plurality of second touch electrodes disposed in a second diagonal direction intersecting the first diagonal direction.

Each of the plurality of first touch electrodes includes two or more first unit electrodes that are arranged in the first diagonal direction and are electrically connected, and each of the plurality of second touch electrodes includes two or more second touch electrodes that are arranged in the second diagonal direction and are electrically connected.

The plurality of touch lines may include a plurality of first touch lines corresponding to the plurality of first touch electrodes and a plurality of second touch lines corresponding to the plurality of second touch electrodes.

Each of the plurality of first touch lines may electrically connect one representative first unit electrode of two or more first unit electrodes included in a corresponding first touch electrode to the pad portion.

Each of the plurality of second touch lines may electrically connect one representative second unit electrode of two or more second unit electrodes included in a corresponding second touch electrode to the pad portion.

Each of the plurality of first touch lines may overlap one or more second unit electrodes, or each of the plurality of second touch lines may overlap one or more first unit electrodes.

Each of the plurality of first touch lines and the plurality of second touch lines may extend in one or more directions different from the first and second diagonal directions. For example, each of the plurality of first touch lines and the plurality of second touch lines may be disposed to extend in a y-axis direction.

Each of the plurality of first touch lines may overlap one or more second unit electrodes located between the connected representative first unit electrode and the pad portion.

Each of the plurality of second touch lines may overlap one or more first unit electrodes located between the connected representative second unit electrode and the pad portion.

The two or more first unit electrodes included in each of the plurality of first touch electrodes may have different distances from the pad portion.

The two or more second unit electrodes included in each of the plurality of second touch electrodes may have different distances from the pad portion.

A bridge portion between two or more first unit electrodes included in each of the plurality of first touch electrodes may cross a bridge portion between two or more second unit electrodes included in a second touch electrode crossing the corresponding first touch electrode.

The shape of each of the plurality of unit electrodes may be a rectangle, a square, or the like.

When the shape of each of the plurality of unit electrodes is a square, and touch sensing resolution in the first diagonal direction and the second diagonal direction is k, in each of the plurality of unit electrodes, a diagonal length may be k, and a length in the x-axis direction may be $k/\sqrt{2}$, and a length in the y-axis direction may be $k/\sqrt{2}$.

Each of the plurality of first touch electrodes may include p first unit electrodes that are continuously arranged on a straight line in the first diagonal direction and are electrically connected to one another.

Each of the plurality of second touch electrodes may include p second unit electrodes that are continuously arranged on a straight line in the second diagonal direction and are electrically connected to one another.

When the shape of each of the plurality of unit electrodes is a square, when the areas of each of the plurality of first touch electrodes and the plurality of second touch electrodes are S, in each of the plurality of unit electrodes, a diagonal length may be $(2S/p)^{(1/2)}$, a length in the x-axis direction may be $(S/p)^{(1/2)}$, and a length in the y-axis direction may be $(S/p)^{(1/2)}$.

Each of the plurality of unit electrodes may include touch sensor metals patterned in a mesh form.

Each of the plurality of unit electrodes may include one or more first touch sensor metals and one or more second touch sensor metals, which are electrically connected to one another.

The first touch sensor metal and the second touch sensor metal may cross each other and be located in different layers.

One of the first touch sensor metal and the second touch sensor metal may be disposed to extend in the x-axis direction, and the other may be disposed to extend in the y-axis direction.

Each of the two or more first unit electrodes may include a plurality of first touch sensor metals and a plurality of second touch sensor metals.

Among the two or more first unit electrodes, a specific first touch sensor metal among a plurality of first touch sensor metals included in one first unit electrode may be electrically connected to a specific second touch sensor metal among a plurality of second touch sensor metals included in another first unit electrode adjacent to the one first unit electrode in the first diagonal direction.

Here, a first bridge node at which the specific first touch sensor metal and the specific second touch sensor metal are electrically connected may be located in an area of a second unit electrode adjacent to the one first unit electrode.

Each of the two or more second unit electrodes may include a plurality of first touch sensor metals and a plurality of second touch sensor metals.

Among the two or more second unit electrodes, a specific second touch sensor metal among a plurality of second touch sensor metals included in one second unit electrode may be electrically connected to a specific first touch sensor metal among a plurality of first touch sensor metals included in another second unit electrode adjacent to the one second unit electrode in the second diagonal direction.

Here, a second bridge node at which the specific first touch sensor metal and the specific second touch sensor metal are electrically connected may be located in an area of a first unit electrode adjacent to the one second unit electrode.

One or more first touch sensor metals may include the same material as a data line for display driving, and one or more second touch sensor metals may include the same material as a gate line for the display driving.

The plurality of unit electrodes may include at least three first unit electrodes arranged in the first diagonal direction and electrically connected, at least three second unit electrodes arranged in the second diagonal direction and electrically connected, two first unit electrodes arranged in the first diagonal direction and electrically connected, and two second unit electrodes arranged in the second diagonal direction and electrically connected.

The two first unit electrodes arranged in the first diagonal direction and electrically connected, and the two second unit electrodes arranged in the second diagonal direction and electrically connected may be located in an edge.

The touch display device according to aspects of the present disclosure may further include a touch sensing circuit for outputting a touch driving signal whose voltage level is changed to at least one of the plurality of first touch lines and the plurality of second touch lines.

The touch sensing circuit can detect a coordinate value in the first diagonal direction and a coordinate value in the second diagonal direction based on a signal received from a first touch line to which a touch driving signal is applied and a signal received from a second touch line to which the touch driving signal is applied.

According to aspects of present disclosure, a touch display device is provided that includes a substrate, a pad portion disposed in an edge of the substrate, a plurality of unit electrodes, and a plurality of touch lines electrically connecting one or more of the plurality of unit electrodes to the pad portion.

The plurality of unit electrodes may include two or more first unit electrodes arranged in a first direction and electrically connected, and two or more second unit electrodes arranged in a second direction crossing the first direction and electrically connected.

A first touch electrode may include two or more first unit electrodes electrically connected, and a second touch electrode may include two or more second unit electrodes electrically connected.

The plurality of touch lines may include a first touch line corresponding to the first touch electrode and electrically connecting one of two or more first unit electrodes to a first pad in the pad portion, and a second touch line correspond to the second touch electrode and electrically connecting one of two or more second unit electrodes to a second pad in the pad portion.

Each of the first touch line and the second touch line may be disposed in a third direction. The third direction may be different from the first direction and the second direction.

An angle between the first direction and the third direction may be greater than 0 degree and smaller than 90 degrees, and an angle between the second direction and the third direction may be greater than 90 degrees and smaller than 180 degrees.

An angle between the first direction and the third direction may be greater than 90 degrees and smaller than 180 degrees, and an angle between the second direction and the third direction may be greater than 0 degree and smaller than 90 degrees.

According to embodiments of the present disclosure, it is possible to provide touch display devices having a touch sensor structure capable of reducing the number of touch lines and touch channels.

According to embodiments of the present disclosure, it is possible to provide touch display devices having a touch sensor structure capable of improving transmittance of a display panel by reducing the number of touch electrodes when a touch panel is embedded in the display panel.

According to embodiments of the present disclosure, it is possible to provide touch display devices capable of displaying uniform images by enabling a substantial equal parasitic capacitance to be formed across a gate line or a data line for each touch electrode.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings.

DETAILED DESCRIPTION

Figure 1:
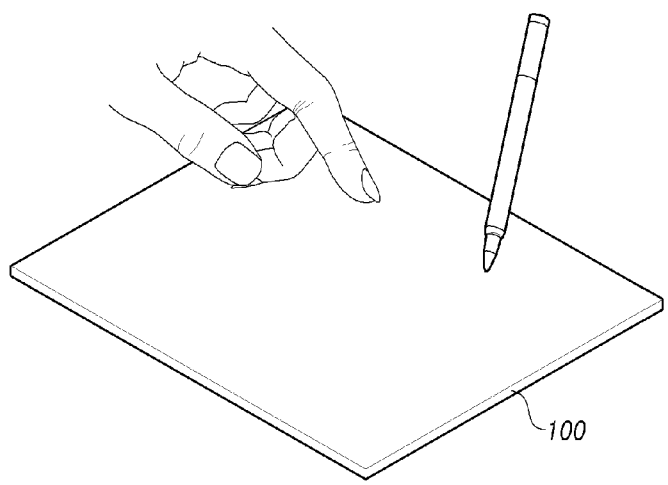
FIG. 1 illustrates a system configuration of a touch display device according to aspects of the present disclosure.

Hereinafter, the preferred embodiments of the present disclosure will be described in detail with reference to the accompanying drawings. In denoting elements of the drawings by reference numerals, the same elements will be referenced by the same reference numerals even when the elements are illustrated in different drawings. In the following description of the disclosure, detailed description of known functions and configurations incorporated herein may be omitted when it may make the subject matter of the disclosure rather unclear. The terms such as "including", "having", "containing", "comprising of", and "consist of" used herein are generally intended to allow other components to be added unless the terms are used with the term "only". Singular forms used herein are intended to include plural forms unless the context clearly indicates otherwise.

Further, the terms "first", "second", "A", "B", "(a)", "(b)", or the like may be used to describe elements included in embodiments of the present disclosure. Each of the terms is not used to define essence, order, sequence, or number of an element, but is used merely to distinguish the corresponding element from another element.

Herein, situations in which two or more elements included in embodiments of the present disclosure are connected, combined, coupled, contacted, or the like may include not only directly or physically connecting, combining, coupling, or contacting between two or more elements, but interposing of another element between the two or more elements. Here, the another element may be included in one or more of the two or more elements connected, combined, coupled, or contacted (to) one another.

In describing time relative terms with reference to elements, operations, steps, or processes included in embodiments of the present disclosure, situations in which "after", "subsequent to", "next to", "before", or the like is used to describe a temporal sequential relationship or a flow sequential relationship between events, operations, or the like are generally intended to include events, situations, cases, operations, or the like that do not occur consecutively unless the terms, such as "directly", "immediately", or the like, are used.

Meanwhile, when numerical values for elements included in embodiments of the present disclosure or their associated information (e.g., levels etc.) are described, even when specific relevant descriptions are not given, the numerical values or the associated information may be interpreted as including a margin of error that can be caused by several factors (e.g., factors in the process, internal or external impact, noise, etc.).

FIG. 1 illustrates a system configuration of a touch display device 100 according to aspects of the present disclosure.

The touch display device 100 according to aspects of the present disclosure is able to provide an image display function of displaying images, and a touch sensing function of sensing a touch by a touch object such as a finger, a pen, and/or the like. Here, the term 'pen' is sometimes referred to as a stylus or a stylus pen, and may include an active pen that has signal transmission and reception functions, is able to perform an operation through interlinking with the touch display device 100, and/or includes its own power supply, a passive pen that does not have signal transmission and reception functions and/or does not include its own power supply, and the like.

In one embodiment, the touch display device 100 may be a television (TV), a computer monitor, a vehicle monitor, or the like, or may be a mobile device such as a tablet, a smart phone, and the like.

In one embodiment, the touch display device 100 may include a display part for displaying images and a touch sensing part for sensing touches.

Hereinafter, a display part and a touch sensing part of the touch display device 100 will be described in more detail with reference to FIGS. 2A and 2B.

Figure 2A:
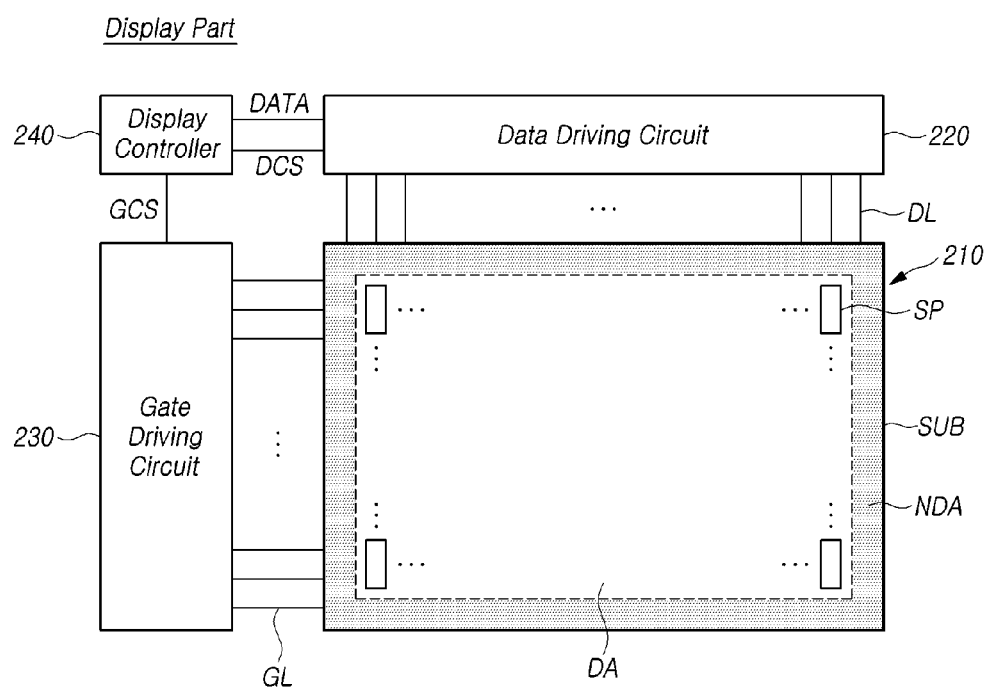
FIG. 2A illustrates a display part of the touch display device according to aspects of the present disclosure.

FIG. 2A illustrates the display part of the touch display device 100 according to aspects of the present disclosure.

Referring to FIG. 2A, the display part of the touch display device 100 according to aspects of the present disclosure includes a display panel 210, a data driving circuit 220, a gate driving circuit 230, a display controller 240, and the like.

The display panel 210 includes a substrate SUB, a plurality of data lines DL and a plurality of gate lines GL disposed on or over the substrate SUB, and a plurality of sub-pixels SP disposed on or over the substrate SUB and connected to the plurality of data lines DL and the plurality of gate lines GL.

The display panel 210 may include a display area DA in which an image is displayed and a non-display area NDA in which an image is not displayed. The plurality of sub-pixels SP may be arranged in the display area DA of the display panel 210. Various types of signal lines may be arranged in the non-display area NDA of the display panel 210.

The data driving circuit 220 and the gate driving circuit 230 may be electrically connected to the non-display area NDA of the display panel 210.

The data driving circuit 220 can drive the plurality of data lines DL by supplying data voltages to the plurality of data lines DL.

The gate driving circuit 230 can drive the plurality of gate lines GL by supplying gate signals (referred to as scan signals) to the plurality of gate lines GL.

The display controller 240 can control operations of the data driving circuit 220 and the gate driving circuit 230 by supplying various types of control signals DCS and GCS to the data driving circuit 220 and the gate driving circuit 230.

The display controller 240 starts a scanning operation according to timings scheduled in each frame, converts image data inputted from other devices or other image providing sources (e.g., a host system) to a data signal type used in the data driving circuit 220 and then supplies image data DATA resulting from the converting to the data driving circuit 220, and controls the loading of the data to at least one pixel at a pre-configured time according to a scan timing.

The display controller 240 may be a timing controller TCON used in a typical display device, or a controller including the timing controller.

The display controller 240 may be implemented in a separate component from the data driving circuit 220, or integrated with the data driving circuit 220 and implemented into an integrated circuit.

The data driving circuit 220 may be located on, but not limited to, only one side (e.g., an upper portion or a lower portion) of the display panel 210, or in another embodiment, the data driving circuit 220 may be located on, but not limited to, two sides (e.g., the upper portion and the lower portion) of the display panel 210, according to driving schemes, panel design schemes, or the like.

The data driving circuit 220 may be electrically connected to the non-display area NDA of the display panel 210. In another embodiment, the data driving circuit 220 may be disposed to overlap the display area DA of the display panel 210.

The data driving circuit 220 may be implemented by including at least one source driver integrated circuit. Each source driver integrated circuit may include a shift register, a latch circuit, a digital-to-analog converter DAC, an output buffer, and the like. In some embodiments, each source driver integrated circuit may further include an analog-to-digital converter according to design schemes.

In some embodiments, the data driving circuit 220 may be connected to the display panel 210 in a tape automated bonding (TAB) type, or connected to a conductive pad such as a bonding pad of the display panel 210 in a chip on glass (COG) type or a chip on panel (COP) type, or connected to the display panel 210 in a chip on film (COF) type.

The gate driving circuit 230 may be located on, but not limited to, only one side (e.g., an upper portion, a lower portion, a left side, or a right side) of the display panel 210, or in another embodiment, the gate driving circuit 230 may be located on, but not limited to, two sides (e.g., the upper portion and the lower portion, or the left side and the right side) of the display panel 210, according to driving schemes, panel design schemes, or the like.

The gate driving circuit 230 may be electrically connected to, or disposed in, the non-display area NDA of the display panel 210. In another embodiment, the gate driving circuit 230 may be disposed to overlap the display area DA of the display panel 210.

The gate driving circuit 230 may be implemented by including at least one gate driver integrated circuit. Each gate driver integrated circuit may include a shift register, a level shifter, and the like.

In some embodiments, the gate driving circuit 230 may be connected to the display panel 210 in a tape automated bonding (TAB) type, or connected to a conductive pad such as a bonding pad of the display panel 210 in a chip on glass (COG) type or a chip on panel (COP) type, or connected to the display panel 210 in a chip on film (COF) type. In another embodiment, the gate driving circuit 230 may be located in the non-display area NDA of the display panel 210 in a gate in panel (GIP) type. The gate driving circuit 230 may be disposed on or over a substrate SUB, or connected to the substrate SUB. That is, in the case of the GIP type, the gate driving circuit 230 may be disposed in the non-display area NDA of the substrate SUB. The gate driving circuit 230 may be connected to the substrate SUB in the case of the chip on glass (COG) type, the chip on film (COF) type, or the like.

At least one of the data driving circuit 220 and the gate driving circuit 230 may be disposed in the display area DA. For example, at least one of the data driving circuit 220 and the gate driving circuit 230 may be disposed not to overlap sub-pixels SP, or disposed to overlap one or more, or all, of the sub-pixels SP.

The display panel 210 may be one of various types of display panels such as a liquid crystal display panel, an organic light emitting display panel, an electroluminescence display panel, a plasma display panel, and the like.

Figure 2B:
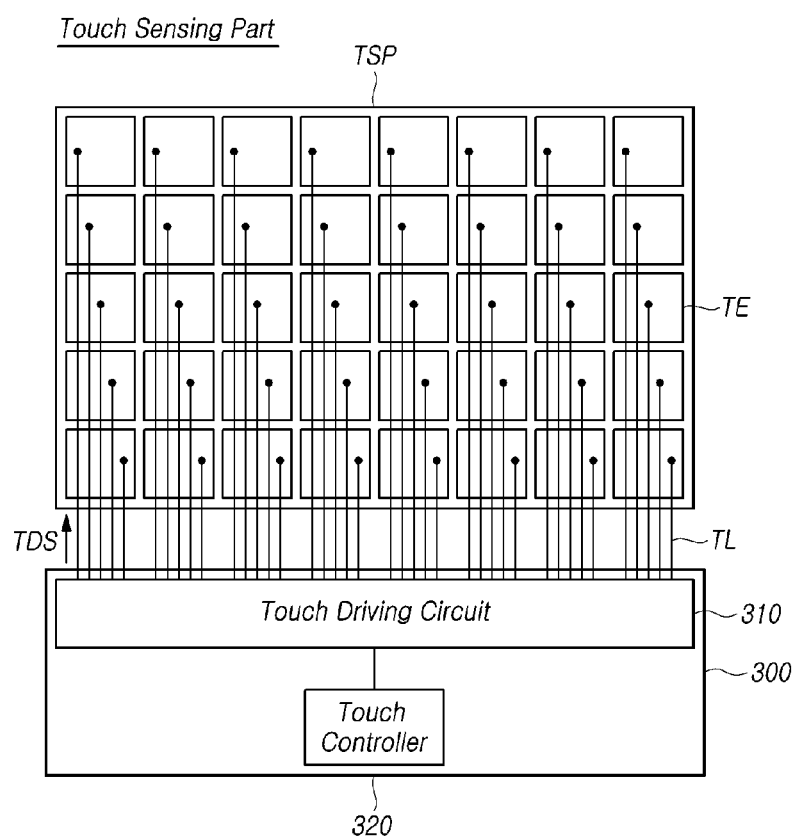
FIG. 2B illustrates a touch sensing part of the touch display device according to aspects of the present disclosure.

FIG. 2B illustrates the touch sensing part of the touch display device 100 according to aspects of the present disclosure.

Referring to FIG. 2B, the touch display device 100 according to aspects of the present disclosure may include a touch panel TSP and a touch sensing circuit 300 to sense a touch input by a finger and/or a pen.

The touch sensing circuit 300 may include a touch driving circuit 310 that drives and senses the touch panel TSP and outputs sensed data, and a touch controller 320 that receives the sensed data from the touch driving circuit 310 and calculates a touch position.

The touch panel TSP may include one or more touch sensors including a plurality of touch electrodes TE. The touch panel TSP may further include a plurality of touch lines TL for electrically connecting the plurality of touch electrodes TE to the touch driving circuit 310.

The touch driving circuit 310 can supply a touch driving signal TDS to one or more, or all, of the plurality of touch electrodes TE, generate sensing data by sensing one or more, or all, of the plurality of touch electrodes TE, and supply the generated sensing data to the touch controller 320. Here, the sensing of the touch electrode TE by the touch driving circuit 310 may mean detecting an electric signal from the touch electrode TE.

The touch controller 320 may acquire the presence or absence of a touch and/or a touch coordinate (a touch position) by using the sensing data received from the touch driving circuit 310.

The touch driving signal TDS may be a signal whose voltage level is changed over time. In an embodiment, the touch driving signal TDS may have one or more of various types of signals, such as a square wave, a triangle wave, a sine wave, or the like.

The touch display device 100 can provide a self-capacitance-based touch sensing function that senses a touch by measuring a capacitance formed across each touch electrode TE or a change in such capacitance, or a mutual-capacitance-based touch sensing function that senses a touch by measuring a capacitance between touch electrodes TE or a change in such capacitance.

The touch display device 100 can provide both the self-capacitance-based touch sensing function and the mutual-capacitance-based touch sensing function. For example, the touch display device 100 may provide the self-capacitance-based touch sensing function and the mutual-capacitance-based touch sensing function in different times or different situations.

When the touch display device 100 provides the self-capacitance-based touch sensing function, the touch driving circuit 310 can supply a touch driving signal TDS to each of the plurality of touch electrodes TE, and sense the touch electrode to which the touch driving signal TDS is applied, and output sensing data, which are generated based on the sensed result. Here, the sensed result corresponds to a capacitance formed between a touch object such as a finger, a pen or the like and the touch electrode TE.

When the touch display device 100 provides the mutual-capacitance-based touch sensing function, the plurality of touch electrodes TE are divided into driving touch electrodes and sensing touch electrodes, and the touch driving circuit 310 can supply a touch driving signal TDS to the driving touch electrodes, sense the sensing touch electrodes, and output sensing data, which are generated based on the sensed result. Here, the sensed result corresponds to a capacitance formed between the sensing touch electrode and the driving touch electrode.

Figure 3:
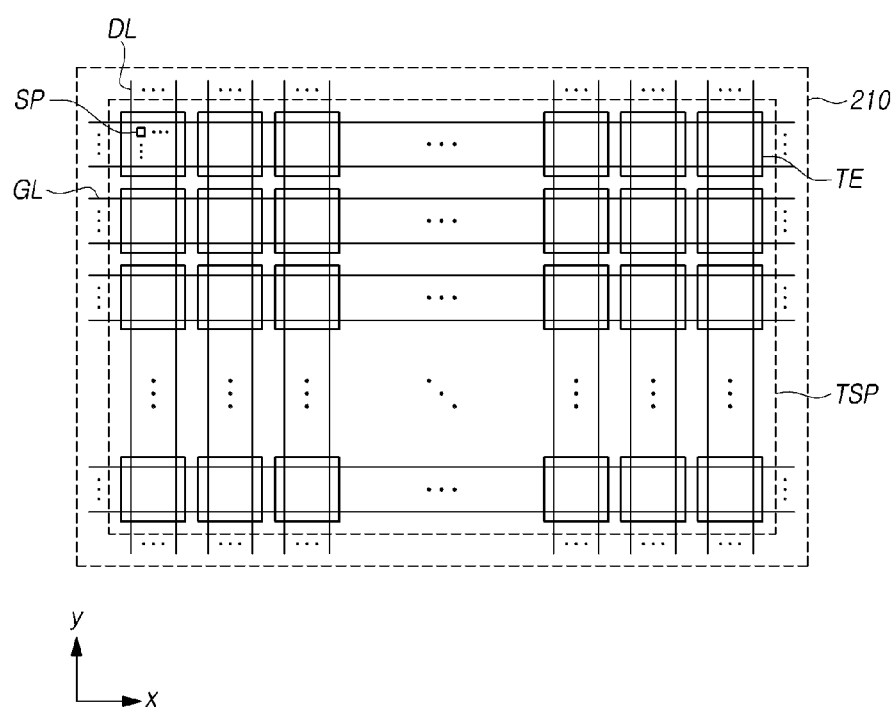
FIG. 3 illustrates a display panel and a touch panel of the touch display device according to aspects of the present disclosure.

FIG. 3 illustrates the display panel 210 and touch panel TSP of the touch display device 100 according to aspects of the present disclosure.

Referring to FIG. 3, in the touch display device 100 according to aspects of the present disclosure, the touch panel TSP may be located outside of the display panel 210 or may be embedded in the display panel 210.

When the touch panel TSP is located outside of the display panel 210, the touch panel TSP and the display panel 210 are manufactured in different manufacturing processes, and thereafter, the touch panel TSP and the display panel 210 can be bonded.

When the touch panel TSP is embedded in the display panel 210, a plurality of touch electrodes TE may be formed together during a process in which the display panel 210 is manufactured.

Meanwhile, the plurality of touch electrodes TE may be dedicated electrodes for touch sensing. In another embodiment, the plurality of touch electrodes TE may be electrodes that may be utilized even when display driving is performed. For example, the plurality of touch electrodes TE may be used for display driving as a common electrode to which a common voltage is applied, as well as being used for touch sensing.

Hereinafter, for convenience of description, it is assumed that the touch display device 100 provides the self-capacitance-based touch sensing function, and the touch panel TSP is embedded in the display panel 210.

In an embodiment, in the touch panel TSP of the touch display device 100 according to aspects of the present disclosure, a plurality of touch electrodes TE may be arranged in a matrix pattern.

Each of the plurality of touch electrodes TE may be electrically connected to the touch driving circuit 310 through one or more touch lines TL.

A plurality of touch lines TL may overlap one or more touch electrodes TE. In some embodiments, the plurality of touch lines TL may be connected to the touch driving circuit 310 by running along an area where the plurality of touch electrodes TE are not disposed.

Although the drawings illustrate that one touch electrode TE or an area occupied by one touch electrode TE has a square block shape, this is merely an example for convenience of description; embodiments described herein are not limited thereto. In an embodiment, the touch electrode TE may be designed in various shapes, such as a diamond, a long rectangle, or the like. Although FIG. 2B illustrates that each touch electrode TE or an area occupied by each touch electrode TE has the same size and shape, this is merely an example for convenience of description; embodiments described herein are not limited thereto. In an embodiment, at least one of a size and a shape of one of the plurality of touch electrodes TE or an area occupied by one of the plurality of touch electrodes TE may be different from at least one of a size and a shape of other touch electrode of the plurality of touch electrodes TE or an area occupied by the other touch electrode of the plurality of touch electrodes TE.

One touch electrode TE may be a plate-type electrode having no opening or a mesh-type electrode having at least one opening.

As described above, the touch panel TSP may be embedded in the display panel 210. In this embodiment, a plurality of touch electrodes TE may be formed together in a process of manufacturing the display panel 210.

A size of an area in which one touch electrode TE is disposed may correspond to a size of an area in which one sub-pixel SP is disposed. In another embodiment, as illustrated in FIG. 3, a size of an area in which one touch electrode TE is disposed may be larger than a size of an area in which one sub-pixel SP is disposed.

When a size of an area in which one touch electrode TE is disposed is larger than a size of an area in which two or more sub-pixels SP are disposed, one touch electrode TE may overlap two or more data lines DL and two or more gate lines GL.

The touch driving circuit 310 and the touch controller 320 may be implemented in respective separate components or integrated into one component.

In an embodiment, the touch driving circuit 310 may be implemented in a readout IC, and the touch controller 320 may be implemented in a micro control unit MCU.

Meanwhile, the touch driving circuit 310 and the data driving circuit 220 may be integrated and implemented in one integrated circuit chip. The driving circuit in which the touch driving circuit 310 and the data driving circuit 220 are integrated may be implemented as one or more integrated circuit chips.

In an embodiment, a touch driving signal TDS may have one or more of various types of signals, such as a square wave, a triangle wave, a sine wave, or the like. In an embodiment, when the touch driving signal TDS of the square wave is employed, such a touch driving signal TDS may be a type of a pulse width modulation (PWM) signal.

Referring to FIG. 3, the data line DL and the gate line GL may cross each other.

For example, the data line DL may extend in a y-axis direction, and the gate line GL may extend in an x-axis direction crossing the y-axis direction. In another embodiment, the data line DL may extend in the x-axis direction, and the gate line GL may extend in the y-axis direction crossing the x-axis direction.

Hereinafter, for convenience of description, it is assumed that the data line DL extends in the y-axis direction, and the gate line GL extends in the x-axis direction crossing the y-axis direction. However, embodiments of the present disclosure are not limited thereto; for example, the data line DL and the gate line GL may run in various directions as long as they cross each other. In an embodiment, an angle between the data line DL and the gate line GL may not be 90 degrees (vertical), and be an angle between 0 degree and 90 degrees.

Figure 4:
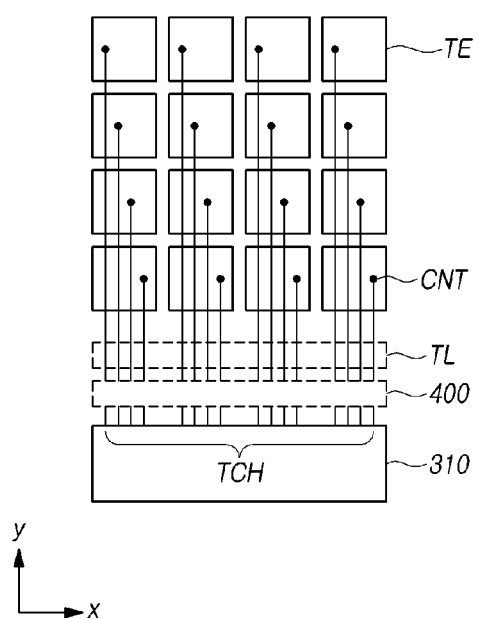
FIG. 4 illustrates an example split-type touch sensor structure of the touch display device according to aspects of the present disclosure.

FIG. 4 illustrates a split-type touch sensor structure of the touch display device 100 according to aspects of the present disclosure.

Referring to FIG. 4, the touch panel TSP of the touch display device 100 according to aspects of the present disclosure may include a plurality of touch electrodes TE as touch sensors, and the plurality of touch electrodes TE may be arranged by being separated from each other.

The plurality of touch electrodes TE are not only physically separated from each other, but also electrically separated from one another in the touch panel TSP. Such a touch sensor structure is referred to as the split-type touch sensor structure. However, two or more, or all, of the plurality of touch electrodes TE may be electrically connected in the touch driving circuit 310.

In the case of the split-type touch sensor structure, each of the plurality of touch electrodes TE may be electrically connected to a touch line TL through one or more contact holes CNT.

The plurality of touch electrodes TE may be located in the display area DA. In some embodiments, one or more of the plurality of touch electrodes TE (e.g., one or more outermost touch electrodes) may be located in an edge area (an outer edge) of the display area DA or disposed to extend up to the edge area (the outer edge) of the display area DA. Here, the display area DA is an area in which an image is displayed, and may be an area in which touch sensing is available.

As shown in FIG. 4, a plurality of touch lines TL electrically connected to the plurality of touch electrodes TE may be located in the display area DA. In some embodiments, one or more, or all, of the plurality of touch lines TL may be located in an edge of the display area DA.

As shown in FIG. 4, when the plurality of touch lines TL electrically connected to the plurality of touch electrodes TE are located in the display area DA, the plurality of touch lines TL may be located in one or more different layers from the plurality of touch electrodes TE and overlap the plurality of touch electrodes TE.

Referring to FIG. 4, a length of each of the plurality of touch lines TL may be different depending on a location of a touch electrode TE electrically connected thereto. Accordingly, the length of each of the plurality of touch lines TL may be a distance from the pad portion 400 to a location at which the corresponding contact hole CNT is located.

In another embodiment, all of the plurality of touch lines TL may have a length equal or similar to one another. That is, the plurality of touch lines TL may be disposed from a pad portion 400 to which the touch driving circuit 310 is connected to a location opposite to the pad portion 400 regardless of a location of the contact hole CNT.

Referring to FIG. 4, in the case of the split-type touch sensor structure, in a situation where one touch electrode TE is electrically connected to one touch line TL, the number of the plurality of touch lines TL is required as many as the number of the plurality of touch electrodes. Here, the number of the plurality of touch lines TL corresponds to the number of touch channels TCH through which signals are input to, or output from, the touch driving circuit 310.

According to the illustration of FIG. 4, the split-type touch sensor structure may include 16 touch electrodes TE arranged in 4 rows and 4 columns, and include 16 touch lines TL for electrically connecting the 16 touch electrodes TE to the touch driving circuit 310. Accordingly, the touch driving circuit 310 has 16 touch channels TCH.

In the case of the split-type touch sensor structure, the number of touch electrodes TE is a value obtained by multiplying the number of touch electrode rows by the number of touch electrode columns, and the number of touch lines TL and the number of touch channels TCH may be the same as the number of touch electrodes TE.

In the case of the split-type touch sensor structure, as the number of touch electrodes TE increases, the number of touch lines TL and the number of touch channels TCH may also increase.

When a size of the touch panel TSP is increased or the number of touch electrodes TE is increased to improve the accuracy of touch sensing, the number of touch lines TL is increased, and the number of touch channels TCH of the touch driving circuit 310 is also increased. Due to this, the manufacturing of the panel becomes complicated and difficult, and in particular, the internal circuit structure of the touch driving circuit 310 may also become complicated due to the large number of touch channels TCH.

Meanwhile, the split-type touch sensor structure as shown in FIG. 4 may be a touch sensor for sensing a touch based on a self-capacitance of each touch electrode TE, or be a touch sensor for sensing the touch based on a mutual-capacitance between touch electrodes TE.

Figure 5:
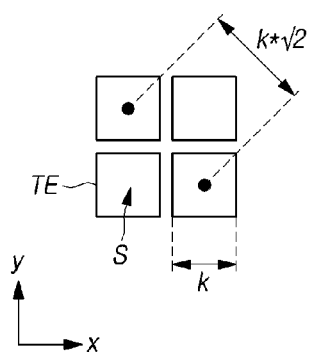
FIG. 5 illustrates a relationship between a touch electrode and sensing resolution in the split-type touch sensor structure of the touch display device according to aspects of the present disclosure.

FIG. 5 illustrates a relationship between a touch electrode and sensing resolution in the split-type touch sensor structure of the touch display device 100 according to aspects of the present disclosure.

Referring to FIG. 5, in the split-type touch sensor structure, discussions are conducted on an assumption in which the shape of one touch electrode TE is a square having the same horizontal length and the same vertical length.

Further, one touch electrode TE may be configured by combining several small electrodes. In this situation, it is assumed that an area occupied by one touch electrode TE has a square shape having the same horizontal length and the same vertical length. Hereinafter, the term "touch electrode TE" may be referred to as one electrode or an area occupied by one electrode. Alternatively, the touch electrode TE may be referred to as a combination of several electrode metals or an area occupied by the several electrode metals.

Referring to FIG. 5, in the split-type touch sensor structure, a length in the x-axis direction and a length in the y-axis direction of one touch electrode TE are k. Further, a diagonal length of one touch electrode TE may be $(k*\sqrt{2})$.

An area S of one touch electrode TE or an area occupied by one touch electrode TE is $(k^2)$. Here, "^" represents an exponent. For example, $k^2$ means that k is raised to the power of 2, and $(k^{(1/2)})$ means that k is raised to the power of (1/2), that is, $\sqrt{k}$. Hereinafter, "^" may be used to express the exponent.

If a distance between the adjacent touch electrodes TE is very small, such a distance between the adjacent touch electrodes TE may be ignored. In this case, a distance between the respective centers of the adjacent touch electrodes TE may be regarded as being substantially equal to a diagonal length of one touch electrode TE, and thus, be $(k*\sqrt{2})$.

The touch sensing performance of the touch sensor structure may be represented as touch sensing resolution, which means capability to distinguish and sense two adjacent touch points. Touch sensing resolution may also be referred to as "touch sensing capability".

As described above, when a length in the x-axis direction and a length in the y-axis direction of each touch electrode TE are k, and a distance between respective centers of the touch electrodes TE is (k*√2), the split-type touch sensor structure has a touch sensing resolution value corresponding to k in the X-axis direction, a touch sensing resolution value corresponding to k in the y-axis direction, and a touch sensing resolution value corresponding to (k*√2) in the diagonal direction. Here, it can be seen that the smaller the touch sensing resolution value, the better the touch sensing capability is.

Hereinafter, there is provided a touch sensor structure capable of reducing the number of touch lines TL and the number of the touch channels TCH of the touch driving circuit 310, while having touch sensing resolution equivalent to that of the split-type touch sensor structure of FIGS. 4 and 5.

The touch sensor structure according to embodiments of the present disclosure described below is a woven-type touch sensor structure capable of reducing the number of touch lines TL and the number of touch channels TCH.

In the woven-type touch sensor structure according to embodiments described herein, unit touch electrodes may include a predetermined number of unit electrodes connected in a first diagonal direction to form a touch electrode TE in the first diagonal direction, and predetermined number of other unit electrodes connected in a second diagonal direction to form a touch electrode TE in the second diagonal direction. The touch electrode TE in the first diagonal direction and the touch electrode TE in the second diagonal direction may cross each other as if a fabric is woven by crossing threads.

Hereinafter, the woven-type touch sensor structure according to embodiments described herein will be described in more detail.

Figure 6:
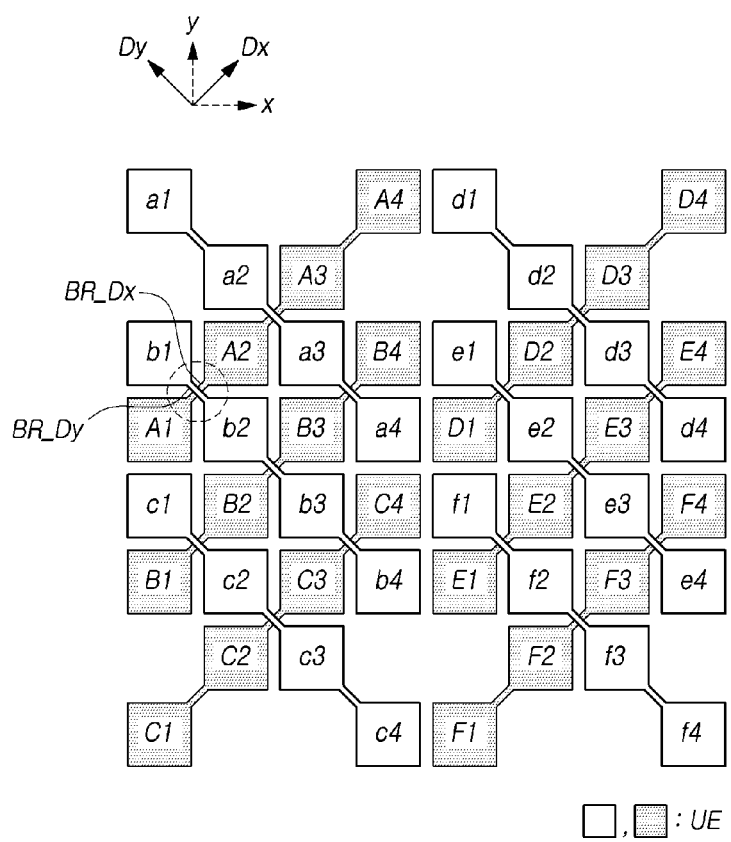
FIG. 6 illustrates an example woven-type touch sensor structure of the touch display device according to aspects of the present disclosure.

FIG. 6 illustrates the woven-type touch sensor structure of the touch display device 100 according to aspects of the present disclosure.

Figure 7:
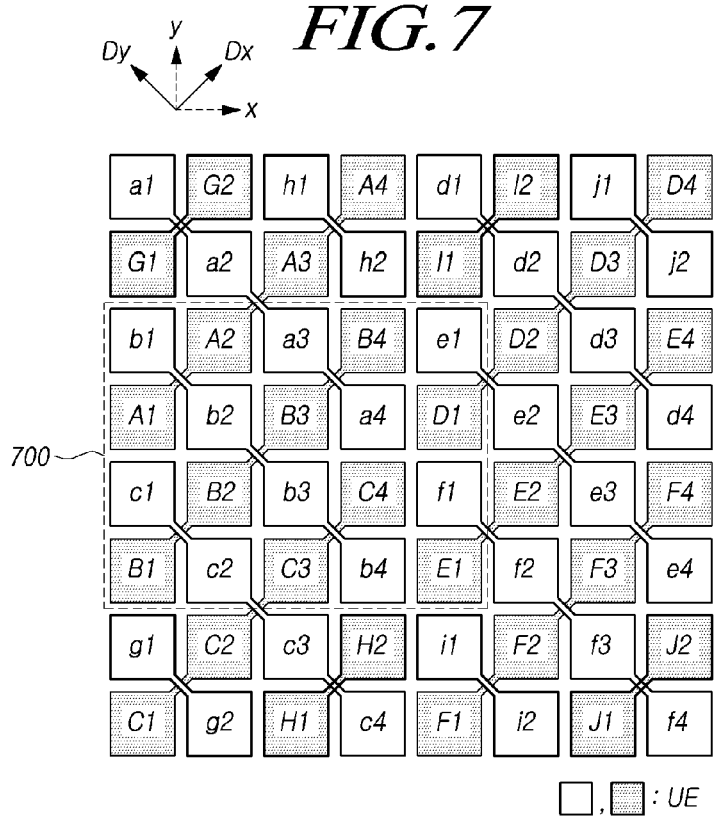
FIG. 7 illustrates an efficient configuration of the woven-type touch sensor structure of the touch display device according to aspects of the present disclosure.

FIG. 7 illustrates an efficient configuration of the woven-type touch sensor structure of the touch display device 100 according to aspects of the present disclosure.

Referring to FIG. 6, the woven-type touch sensor structure according to embodiments described herein may include a plurality of unit electrodes UE arranged in a matrix form over a substrate SUB. For example, each of the plurality of unit electrodes UE may have a shape such as a rectangle, a square, or the like; however, embodiments of the present disclosure are not limited thereto. For example, the unit electrode may have various shapes.

Referring to FIG. 6, the plurality of unit electrodes UE may be classified into a first unit electrode group (A1-A4, B1-B4, C1-C4, D1-D4, E1-E4, F1-F4) connected in a first diagonal direction Dx, and a second unit electrode group (a1-a4, b1-b4, c1-c4, d1-d4, e1-e4, f1-f4) connected in a second diagonal direction Dy intersecting the first diagonal direction Dx.

In the first unit electrode group (A1-A4, B1-B4, C1-C4, D1-D4, E1-E4, F1-F4) among the plurality of unit electrodes UE, four first unit electrodes UE are arranged in the first diagonal direction Dx and are electrically connected to each other.

In the second unit electrode group (a1-a4, b1-b4, c1-c4, d1-d4, e1-e4, f1-f4) among the plurality of unit electrodes UE, four second unit electrodes UE are arranged in the second diagonal direction Dx and are electrically connected to each other.

As shown in FIGS. 6 and 7, in order to distinguish the plurality of unit electrodes UE from one another, unique distinguishing IDs (A1-A4, B1-B4, C1-C4, D1-D4, E1-E4, F1-F4, a1-a4, b1-b4, c1-c4, d1-d4, e1-e4, and f1-f4) are indicated to each of the plurality of unit electrodes UE.

The unique distinguishing IDs (A1-A4, B1-B4, C1-C4, D1-D4, E1-E4, F1-F4, a1-a4, b1-b4, c1-c4, d1-d4, e1-e4, and f1-f4) indicated to each unit electrode UE are represented as a combination of "alphabet" and "number" (e.g., A1, A2, A3, A4, a1, a2, a3, a4, etc.).

The alphabets included in the unique distinguishing IDs indicated to each unit electrode UE represent information for distinguishing electrical connections of unit electrodes UE from one another. That is, an equal alphabet is labeled to unit electrodes UE that are electrically connected together.

The unit electrodes UE arranged in the first diagonal direction Dx and electrically connected to each other are labeled with the same uppercase alphabet (e.g., A, B, C, D, E, F, etc.), and the unit electrodes UE arranged in the second diagonal direction Dy and electrically connected to each other are labeled with the same lowercase alphabet (e.g., a, b, c, d, e, f, etc.).

The numbers included in the unique distinguishing IDs indicated to each unit electrode UE represent information for distinguishing between unit electrodes UE electrically connected to one another. The unit electrodes UE electrically connected together are labeled with numbers sequentially increasing by one and the same alphabet.

For example, four unit electrodes UE labeled with "A1, A2, A3 and A4" represent different four unit electrodes UE arranged in the first diagonal direction Dx corresponding to the same uppercase alphabet A and are electrically connected to each other.

The unique distinguishing IDs (A1-A4, B1-B4, C1-C4, D1-D4, E1-E4, F1-F4, a1-a4, b1-b4, c1-c4, d1-d4, e1-e4, and f1-f4) may be used interchangeably with unit electrodes UE as reference numerals of the unit electrodes UE indicated in the drawings for discussions.

The unique distinguishing IDs (A1-A4, B1-B4, C1-C4, D1-D4, E1-E4, F1-F4, a1-a4, b1-b4, c1-c4, d1-d4, e1-e4, and f1-f4) may be information on unit electrodes UE stored and managed in the touch sensing circuit 300, in addition to representing corresponding reference numerals.

The touch sensing circuit 300 can perform driving and sensing operations using respective unique distinguishing IDs (A1-A4, B1-B4, C1-C4, D1-D4, E1-E4, F1-F4, a1-a4, b1-b4, c1-c4, d1-d4, e1-e4, and f1-f4) of unit electrodes UE.

Referring to FIGS. 6 and 7, four or two first unit electrodes UE (A1-A4, B1-B4, C1-C4, D1-D4, E1-E4, F1-F4, G1-G2, H1-H2, I1-I2, J1-J2) that are electrically connected may be included in one touch electrode TE (TE_A-TE_J), and four or two second unit electrodes UE (a1-a4, b1-b4, c1-c4, d1-d4, e1-e4, f1-f4, g1-g2, h1-h2, j1-j2) that are electrically connected may be included in another touch electrode TE (TE_a-TE_j).

Referring to FIG. 6, the four first unit electrodes UE labeled with distinguishing IDs A1-A4 may be arranged in the first diagonal direction Dx and electrically connected to one another, and thus constitute a first touch electrode TE_A in the form of a first diagonal unit electrode.

The four first unit electrodes UE labeled with distinguishing IDs B1-B4 may be arranged in the first diagonal direction Dx and electrically connected to one another, and thus constitute another first touch electrode TE_B in the form of the first diagonal unit electrode.

The four first unit electrodes UE labeled with distinguishing IDs C1-C4 may be arranged in the first diagonal direction Dx and electrically connected to one another, and thus constitute further another first touch electrode TE_C in the form of the first diagonal unit electrode.

The four first unit electrodes UE labeled with distinguishing IDs D1-D4 may be arranged in the first diagonal direction Dx and electrically connected to one another, and thus constitute further another first touch electrode TE_D in the form of the first diagonal unit electrode.

The four first unit electrodes UE labeled with distinguishing IDs E1-E4 may be arranged in the first diagonal direction Dx and electrically connected to one another, and thus constitute further another first touch electrode TE_E in the form of the first diagonal unit electrode.

The four first unit electrodes UE labeled with distinguishing IDs F1-F4 may be arranged in the first diagonal direction Dx and electrically connected to one another, and thus constitute further another first touch electrode TE_F in the form of the first diagonal unit electrode.

Referring to FIG. 6, the four second unit electrodes UE labeled with distinguishing IDs a1-a4 may be arranged in the second diagonal direction Dy and electrically connected to one another, and thus constitute a second touch electrode TE_a in the form of a second diagonal unit electrode.

The four second unit electrodes UE labeled with distinguishing IDs b1-b4 may be arranged in the second diagonal direction Dy and electrically connected to one another, and thus constitute another second touch electrode TE_b in the form of the second diagonal unit electrode.

The four second unit electrodes UE labeled with distinguishing IDs c1-c4 may be arranged in the second diagonal direction Dy and electrically connected to one another, and thus constitute further another second touch electrode TE_c in the form of the second diagonal unit electrode.

The four second unit electrodes UE labeled with distinguishing IDs d1-d4 may be arranged in the second diagonal direction Dy and electrically connected to one another, and thus constitute further another second touch electrode TE_d in the form of the second diagonal unit electrode.

The four second unit electrodes UE labeled with distinguishing IDs e1-e4 may be arranged in the second diagonal direction Dy and electrically connected to one another, and thus constitute further another second touch electrode TE_e in the form of the second diagonal unit electrode.

The four second unit electrodes UE labeled with distinguishing IDs f1-f4 may be arranged in the second diagonal direction Dy and electrically connected to one another, and thus constitute further another second touch electrode TE_f in the form of the second diagonal unit electrode.

As described above, as one touch electrode TE is configured by electrically connecting four unit electrodes UE, the number of touch lines TL in the touch panel TSP and the number of touch channels TCH of the touch driving circuit 310 can be reduced.

Although FIG. 6 illustrates that four unit electrodes UE are electrically connected, this is merely for convenience of description, and two or more unit electrodes UE may be electrically connected. As the number of unit electrodes UE electrically connected together increases, the number of touch lines TL and the number of touch channels TCH can be more decreased.

Referring to FIG. 6, even if each touch electrode TE is disposed in a diagonal direction, each touch electrode TE may be configured with the same number of unit electrodes UE. Accordingly, each touch electrode TE may overlap with the same number of data lines and/or gate lines, so that the parasitic capacitance that each touch electrode TE forms with the data lines and/or gate lines may be the same.

Accordingly, the data lines and/or gate lines receive the same electrical influence from the respective touch electrodes TE, so that the uniformity of an image displayed by driving the data lines and the gate lines can be improved.

Referring to FIG. 6, one of bridge portions BR_Dx between two or more first unit electrodes UE (e.g., A1-A4) arranged in the first diagonal direction Dx and electrically connected to one another may cross one of bridge portions BR_Dy between two or more second unit electrodes UE (e.g., b1-b4) arranged in the second diagonal direction Dy and electrically connected to one another.

Referring to FIG. 6, the bridge portions BR_Dx between two or more first unit electrodes UE (e.g., A1-A4) arranged in the first diagonal direction Dx and electrically connected to one another may be disposed in a different layer from the bridge portions BR_Dy between two or more second unit electrodes UE (e.g., b1-b4) arranged in the second diagonal direction Dy and electrically connected to one another.

The bridge portions BR_Dx between two or more first unit electrodes UE (e.g., A1-A4) may be configured in a separate electrode pattern from the two or more first unit electrodes UE (e.g., A1-A4), or be configured integrally with either one of the two or more first unit electrodes UE (e.g., A1-A4), or all of the two or more first unit electrodes UE (e.g., A1-A4). The bridge portions BR_Dy between two or more second unit electrodes UE (e.g., b1-b4) may be configured in a separate electrode pattern from the two or more second unit electrodes UE (e.g., b1-b4), or be configured integrally with either one of the two or more second unit electrodes UE (e.g., b1-b4), or all of the two or more second unit electrodes UE (e.g., b1-b4).

Referring to FIGS. 6 and 7, in the woven-type touch sensor structure according to embodiments described herein, in a space where unit electrodes UE are not disposed in an edge portion, as shown in FIG. 7, two unit electrodes (G1-G2, H1-H2, I1-I2, J1-J2, g1-g2, h1-h2, j1-j2) electrically connected may be added to dispose additional touch electrodes (TE_G, TE_H, TE_I, TE_J, TE_g, TE_h, TE_i, TE_j).

Referring to FIG. 7, the two first unit electrodes UE labeled with distinguishing IDs G1 and G2 may be arranged in the first diagonal direction Dx and electrically connected to each other, and thus constitute an additional first touch electrode TE_G in the form of the first diagonal unit electrode.

The two first unit electrodes UE labeled with distinguishing IDs H1 and H2 may be arranged in the first diagonal direction Dx and electrically connected to each other, and thus constitute another additional first touch electrode TE_H in the form of the first diagonal unit electrode.

The two first unit electrodes UE labeled with distinguishing IDs I1 and I2 may be arranged in the first diagonal direction Dx and electrically connected to each other, and thus constitute further another additional first touch electrode TE_I in the form of the first diagonal unit electrode.

The two first unit electrodes UE labeled with distinguishing IDs J1 and J2 may be arranged in the first diagonal direction Dx and electrically connected to each other, and thus constitute further another additional first touch electrode TE_J in the form of the first diagonal unit electrode.

Referring to FIG. 7, the two second unit electrodes UE labeled with distinguishing IDs g1 and g2 may be arranged in the second diagonal direction Dy and electrically connected to each other, and thus constitute an additional second touch electrode TE_g in the form of the second diagonal unit electrode.

The two second unit electrodes UE labeled with distinguishing IDs h1 and h2 may be arranged in the second diagonal direction Dy and electrically connected to each other, and thus constitute another additional second touch electrode TE_h in the form of the second diagonal unit electrode.

The two second unit electrodes UE labeled with distinguishing IDs i1 and i2 may be arranged in the second diagonal direction Dy and electrically connected to each other, and thus constitute further another additional second touch electrode TE_i in the form of the second diagonal unit electrode.

The two second unit electrodes UE labeled with distinguishing IDs j1 and j2 may be arranged in the second diagonal direction Dy and electrically connected to each other, and thus constitute further another additional second touch electrode TE_j in the form of the second diagonal unit electrode.

As described above, in the woven-type touch sensor structure according to embodiments described herein, the plurality of unit electrodes UE may include three or more first unit electrodes (A1-A4, B1-B4, C1-C4, D1-D4, E1-E4, F1-F4) arranged in the first diagonal direction Dx and are electrically connected to one another, three or more second unit electrodes (a1-a4, b1-b4, c1-c4, d1-d4, e1-e4, f1-f4) arranged in the second diagonal direction Dy and electrically connected to one another, two first unit electrodes (G1-G2, H1-H2, I1-I2, J1-J2) arranged in the first diagonal direction Dx and electrically connected to each other, and two second unit electrodes (g1-g2, h1-h2, j1-j2) arranged in the second diagonal direction Dy and electrically connected to each other.

The two first unit electrodes (G1-G2, H1-H2, I1-I2, J1-J2) arranged in the first diagonal direction Dx and electrically connected to each other and the two second unit electrodes (g1-g2, h1-h2, j1-j2) arranged in the second diagonal direction Dy and electrically connected to each other may be located in an edge of the touch panel TSP.

Figure 8:
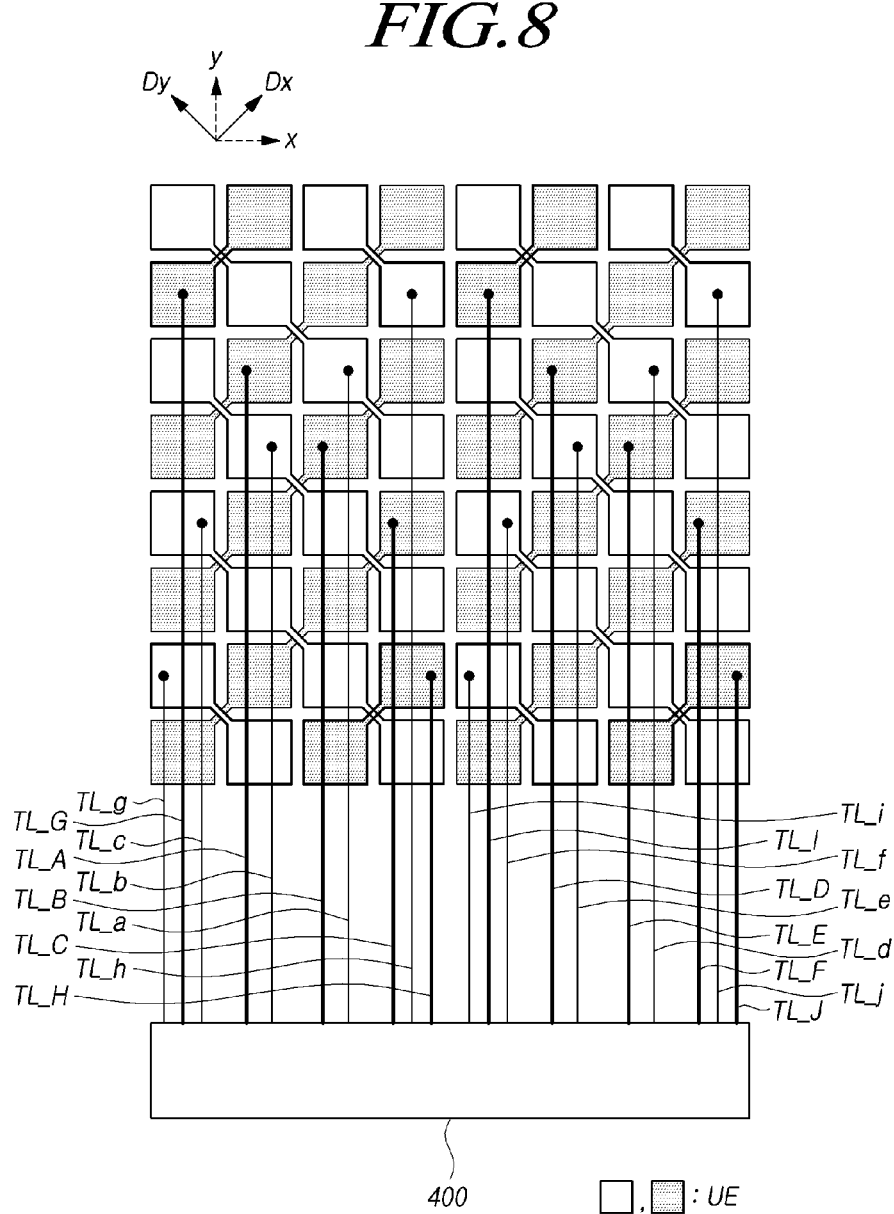
FIG. 8 illustrates touch lines in the woven-type touch sensor structure of the touch display device according to aspects of the present disclosure.

FIG. 8 illustrates touch lines (TL_A~TL_J, TL_a~TL_j) in the woven-type touch sensor structure of the touch display device 100 according to aspects of the present disclosure. In FIG. 8, distinguishing IDs of unit electrodes UE are omitted. Accordingly, for the distinguishing IDs of unit electrodes UE in FIG. 8, the reference is made to the illustration of FIG. 7.

The electrode structure of the woven-type touch sensor structure according to embodiments of the present disclosure described above with reference to FIGS. 6 and 7 will be briefly described below.

Referring to FIG. 7, the plurality of unit electrodes UE may be included in a plurality of first touch electrodes (TE_A-TE_J) disposed in the first diagonal direction Dx and a plurality of second touch electrodes (TE_a-TE_j) disposed in the second diagonal direction Dy.

Referring to FIG. 7, each of the plurality of first touch electrodes (TE_A-TE_J) may include two or more first unit electrodes (A1-A4, B1-B4, C1-C4, D1-D4, E1-E4, F1-F4, G1-G2, H1-H2, I1-I2, J1-J2) arranged in the first diagonal direction Dx and electrically connected.

Referring to FIG. 7, each of the plurality of second touch electrodes (TE_a-TE_j) may include two or more second unit electrodes (a1-a4, b1-b4, c1-c4, d1-d4, e1-e4, f1-f4, g1-g2, h1-h2, j1-j2) arranged in the second diagonal direction Dy and electrically connected.

Referring to FIG. 8, the touch display device 100 according to aspects of the present disclosure may include a pad portion 400 disposed in an edge of the substrate SUB. The pad portion 400 may include a plurality of pads corresponding to the plurality of touch channels TCH.

Referring to FIG. 8, the structure of the woven-type touch sensor according to embodiments of the present invention may include a plurality of touch lines (TL_A-TL_J, TL_a-TL_j) electrically connecting one or more of the plurality of unit electrodes UE to the pad portion 400.

Referring to FIGS. 7 and 8, the plurality of touch lines (TL_A-TL_J, TL_a-TL_j) may include the plurality of first touch lines (TL_A-TL_J) corresponding to the plurality of first touch electrodes (TE_A-TE_J) and the plurality of second touch lines (TL_a-TL_j) corresponding to the plurality of second touch electrodes (TE_a-TE_j).

Each of the plurality of first touch lines (TL_A-TL_J) can electrically connect the pad portion 400 to one representative first unit electrode (e.g., B3) of two or more first unit electrodes (e.g., B1-B4) included in a corresponding first touch electrode (e.g., TE_B) among the plurality of first touch electrodes (TE_A-TE_J).

Each of the plurality of second touch lines (TL_a-TL_j) can electrically connect the pad portion 400 to one representative second unit electrode (e.g., c1) of two or more second unit electrodes (e.g., c1-c4) included in a corresponding second touch electrode (e.g., TE_c) among the plurality of second touch electrodes (TE_a-TE_j).

Referring to FIGS. 8 and 7 together, the distinguishing IDs of the representative unit electrodes UE to which the plurality of first touch lines (TL_A-TL_J) are connected are A2, B3, C4, D2, E3, F4, G1, H2, I1 and J2. Further, the distinguishing IDs of the representative unit electrodes UE to which the plurality of second touch lines (TL_a-TL_j) are connected are a3, b2, c1, d3, e2, f1, g1, h2, i1 and j2.

Referring to FIG. 8, the number of the representative unit electrodes UE to which the plurality of touch lines (TL_A-TL_J, TL_a-TL_j) are connected may be the same as the number of touch electrodes (TE_A-TE_J, TE_a-TE_j).

Referring to FIG. 8, each of the plurality of first touch lines (TL_A-TL_J) may overlap one or more other unit electrodes UE located between a corresponding connected representative first unit electrode (A2, B3, C4, D2, E3, F4, G1, H2, I1, J2) and the pad portion 400. In this situation, each of the plurality of first touch lines (TL_A-TL_J) may be electrically separated from the one or more other overlapping unit electrodes UE.

Referring to FIG. 8, each of the plurality of second touch lines (TL_a-TL_j) may overlap one or more other unit electrodes UE located between a corresponding connected representative second unit electrode (a3, b2, c1, d3, e2, f1, g1, h2, i1, j2) and the pad portion 400. In this situation, each of the plurality of second touch lines (TL_a-TL_j) may be electrically separated from the one or more other overlapping unit electrodes UE.

Referring to FIG. 8, each of the plurality of first touch lines (TL_A-TL_J) and the plurality of second touch lines (TL_a-TL_j) may be disposed to extend in the y-axis direction, rather than being disposed to extend in the first diagonal direction Dx and the second diagonal direction Dy.

Each of the plurality of second touch lines (TL_a-TL_j) may overlap one or more, or a part, of two or more first unit electrodes UE that are arranged in the first diagonal direction Dx and electrically connected to one another.

Among two or more first unit electrodes UE arranged in the first diagonal direction Dx and electrically connected to one another, one or more first unit electrodes UE overlapping a plurality of second touch lines (TL_a-TL_j) may be located between one or more representative second unit electrodes UE and the pad portion 400.

For example, the second touch line TL_b may overlap one first unit electrode B2 of two or more first unit electrodes (B1-B4) arranged in the first diagonal direction Dx and electrically connected to one another.

Among two or more first unit electrodes (B1-B4) arranged in the first diagonal direction Dx and electrically connected to one another, the first unit electrode B2 overlapping the second touch line TL_b may be located between the pad portion 400 and the representative second unit electrode b2 connected to the second touch line TL_b among two or more second unit electrodes (b1-b4) arranged in the second diagonal direction Dy and electrically connected to one another.

Two or more first unit electrodes UE included in each of the plurality of first touch electrodes (TE_A-TE_J) may have distances from the pad portion 400 different from one another.

Two or more second unit electrodes UE included in each of the plurality of second touch electrodes (TE_a-TE_j) may have distances from the pad portion 400 different from one another.

The touch line structure of the woven-type touch sensor structure according to embodiments described herein may be described as follows.

Each of the plurality of first touch lines (TL_A-TL_J) may overlap one or more second unit electrodes UE, or each of the plurality of second touch lines (TL_a-TL_j) may overlap one or more first unit electrodes UE.

Each of the plurality of first touch lines (TL_A-TL_J) may overlap one or more second unit electrodes UE located between a connected corresponding representative first unit electrode UE and the pad portion 400.

Each of the plurality of second touch lines (TL_a-TL_j) may overlap one or more first unit electrodes UE located between a connected corresponding representative second unit electrode UE and the pad portion 400.

Figure 9:
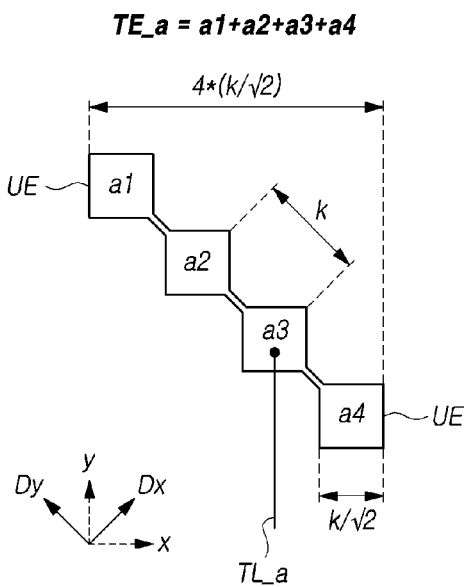
FIG. 9 illustrates a relationship between a touch electrode and sensing resolution in the woven-type touch sensor structure of the touch display device according to aspects of the present disclosure.

FIG. 9 illustrates a relationship between a touch electrode and sensing resolution in the woven-type touch sensor structure of the touch display device 100 according to aspects of the present disclosure. In FIG. 9, discussions are conducted on a second touch electrode TE_a including four second unit electrodes UE indicated by distinguishing IDs labeled with a1-a4 as an example. In this situation, it is assumed that the shape of the unit electrode UE is a square.

Referring to FIG. 9, the woven-type touch sensor structure according to embodiments described herein may be configured with a size of a unit electrode UE to satisfy desired touch sensing resolution.

More specifically, in the woven-type touch sensor structure according to embodiments described herein, in each of a plurality of unit electrodes UE, a center-to-center distance between two adjacent unit electrodes (e.g., a1 and a2, a2 and a3, or a3 and a4) may be k.

Accordingly, in the weave-type touch sensor structure according to embodiments described herein, touch sensing resolution in the first diagonal direction Dx and the second diagonal direction Dy may be k, and touch sensing resolution in the x-axis direction and the y-axis direction may be (k*√2). This is substantially equivalent to the touch sensing resolution of the split-type touch sensor structure of FIG. 5.

Although FIG. 9 illustrates that a distance between the plurality of unit electrodes UE is large for ease of understanding, the distance between the plurality of unit electrodes UE may be negligibly small compared to the size of the unit electrode UE. In this case, the diagonal length of each of the plurality of unit electrodes UE may be k. Accordingly, in each of the plurality of unit electrodes UE, a length in the x-axis direction may be k/√2, and a length in the y-axis direction may be k/√2.

Referring to FIG. 9, the woven-type touch sensor structure according to embodiments described herein can be configured with a size of a unit electrode UE to acquire desired touch sensitivity.

When it is assumed that each of a plurality of first touch electrodes TE includes p (p=4) first unit electrodes UE that are continuously arranged on a straight line in the first diagonal direction Dx and are electrically connected to one another, and each of a plurality of second touch electrodes TE includes p (p=4) second unit electrodes UE that are continuously arranged on a straight line in the second diagonal direction Dy and are electrically connected to one another, for enabling an area of each of the plurality of first touch electrodes TE and the plurality of second touch electrodes TE to satisfy S', in each of the plurality of unit electrodes UE, a diagonal length may be $(2S'/p)^{(1/2)}$, and lengths in the x-axis and y-axis directions may be $(S'/p)^{(1/2)}$.

The area S' of one touch electrode TE is a value obtained by multiplying the area of one unit electrode UE by the number (p) of unit electrodes included in one touch electrode TE.

According to the illustration of FIG. 9, the area S' of one touch electrode TE is $2*k^2$ obtained by multiplying $(k/\sqrt{2})^2$, which is the area of one unit electrode UE, by 4, which is the number (p) of unit electrodes included in one touch electrode TE.

Referring to FIG. 9, in the woven-type touch sensor structure, the area $(S'=2*k^2)$ of one touch electrode TE is twice the area $(S=k^2)$ of one touch electrode TE in the split-type touch sensor structure of FIG. 5. That is, the number of touch electrodes per unit area in the woven-type touch sensor structure may be half the number of touch electrodes per unit area in the split-type touch sensor structure. Accordingly, the transmittance of the display panel 210 in which the touch panel TSP is embedded can be improved.

Figure 10:
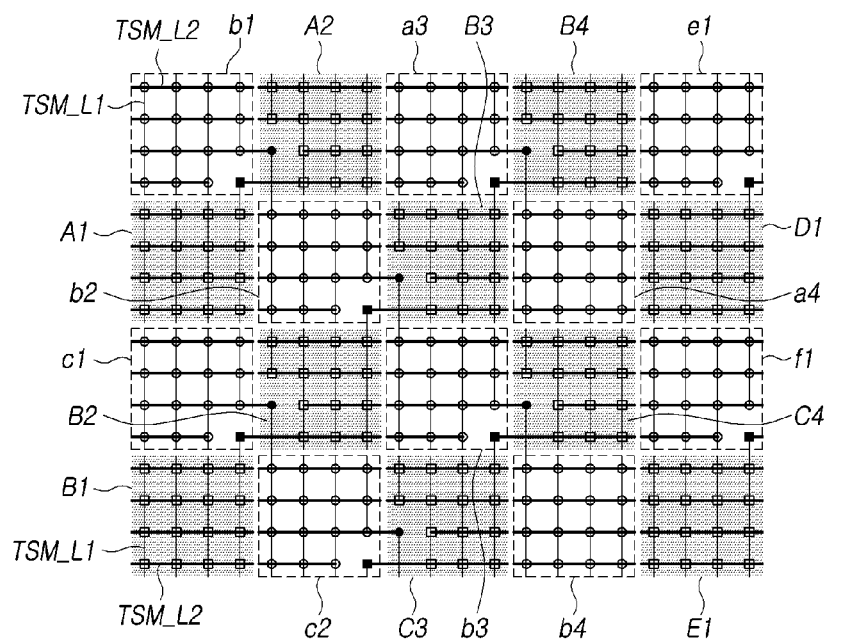
FIG. 10 illustrates specifically the woven-type touch sensor structure of the touch display device according to aspects of the present disclosure.
Figure 11:
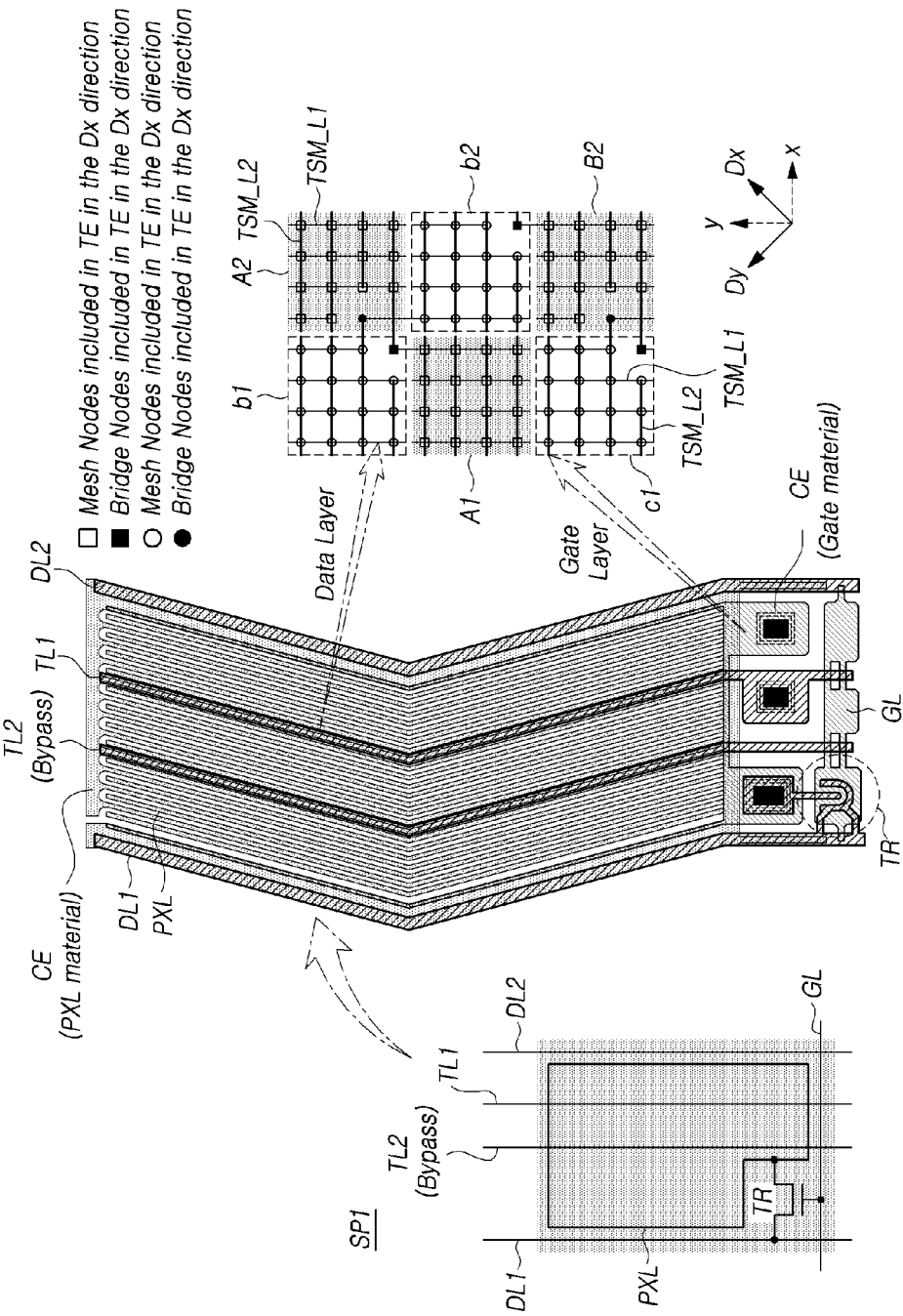
FIG. 11 illustrates a layer structure of a first touch sensor metal and a second touch sensor metal used in the woven-type touch sensor structure of the touch display device according to aspects of the present disclosure.

FIG. 10 illustrates specifically the woven-type touch sensor structure of the touch display device 100 according to aspects of the present disclosure. FIG. 11 illustrates a layer structure of a first touch sensor metal TSM_L1 and a second touch sensor metal TSM_L2 used in the woven-type touch sensor structure of the touch display device according to aspects of the present disclosure.

FIG. 10 is an enlarged view of a box area 700 indicated by dotted lines in FIG. 7, and illustrates a plurality of unit electrodes (A1, A2, B1-B4, C3, C4, D1, E1, a3, a4, b1-b4, c1, c2, e1, and f1) in the box area 700.

Referring to FIG. 10, each of the plurality of unit electrodes (A1, A2, B1-B4, C3, C4, D1, E1, a3, a4, b1-b4, c1, c2, e1, and f1) may include touch sensor metals (TSM_L1 and TSM_L2) that are patterned in a mesh form.

Referring to FIG. 10, each of the plurality of unit electrodes (A1, A2, B1-B4, C3, C4, D1, E1, a3, a4, b1-b4, c1, c2, e1, and f1) may include one or more first touch sensor metals TSM_L1 and one or more second touch sensor metals TSM_L2 that are electrically connected to each other.

The first touch sensor metal TSM_L1 and the second touch sensor metal TSM_L2 may be metals that cross each other and are located in different layers.

One of the first touch sensor metal TSM_L1 and the second touch sensor metal TSM_L2 may be disposed to extend in the x-axis direction, and the other may be disposed to extend in the y-axis direction.

In the illustration of FIG. 10, the first touch sensor metal TSM_L1 may be disposed to extend in the y-axis direction, and the second touch sensor metal TSM_L2 may be disposed to extend in the x-axis direction.

Referring to FIG. 10, a plurality of mesh nodes at which the first touch sensor metals TSM_L1 and the second touch sensor metals TSM_L2 intersect is disposed in each area of the plurality of unit electrodes (A1, A2, B1-B4, C3, C4, D1, E1, a3, a4, b1-b4, c1, c2, e1, and f1).

Referring to FIG. 10, for a connection between two unit electrodes (e.g., A1 and A2, b1 and b2, etc.) arranged in the diagonal direction(s) (Dx and/or Dy), at least one bridge node through which the first touch sensor metal TSM_L1 and the second touch sensor metal TSM_L2 are connected is disposed in an area of all, or one or more, of the plurality of unit electrodes (A1, A2, B1-B4, C3, C4, D1, E1, a3, a4, b1-b4, c1, c2, e1, and f1). Here, for a connection between two unit electrodes (e.g., A1 and A2, b1 and b2, etc.), one bridge node may be disposed, or two or more bridge nodes may be disposed considering resistance reduction or the like. Here, the bridge node is corresponded to the bridge portions BR_Dx and BR_Dy of FIG. 6.

Referring to FIG. 10, for a connection between two unit electrodes (e.g., A1 and A2, b1 and b2, etc.) arranged in the diagonal direction(s) (Dx and/or Dy), each bridge node may be a node (or point) at which a contact hole through which a first touch sensor metal TSM_L1 of one of the two unit electrodes (e.g., A1 and A2, b1 and b2, etc.) and a second touch sensor metal TSM_L2 of the other of the two unit electrodes (e.g., A1 and A2, b1 and b2, etc.) are electrically connected is formed. In some embodiments, at least one bridge node for a connection between two unit electrodes (e.g., A1 and A2, b1 and b2, etc.) arranged in the diagonal direction(s) (Dx and/or Dy) may be formed separately from the two unit electrodes (e.g., A1 and A2, b1 and b2, etc.), or be integrally formed with one, or all, of the two unit electrodes (e.g., A1 and A2, b1 and b2, etc.).

Referring to FIG. 10, each mesh node may serve as a point at which the first touch sensor metal TSM_L1 and the second touch sensor metal TSM_L2 intersect in each area of the plurality of unit electrodes (A1, A2, B1-B4, C3, C4, D1, E1, a3, a4, b1-b4, c1, c2, e1, and f1), and may be a node (point) where a contact hole is formed through which the first touch sensor metal TSM_L1 and the second touch sensor metal TSM_L2 are electrically connected, or a node (point) where the first touch sensor metal TSM_L1 and the second touch sensor metal TSM_L2 are not electrically connected and are insulated from each other.

Referring to FIG. 10, some of mesh nodes that are present in each area of the plurality of unit electrodes (A1, A2, B1-B4, C3, C4, D1, E1, a3, a4, b1-b4, c1, c2, e1, and f1) may be nodes (points) where contact holes are formed where the first touch sensor metal TSM_L1 and the second touch sensor metal TSM_L2 are actually electrically connected, and the other, or other some, of the mesh nodes may be nodes (points) where the first touch sensor metal TSM_L1 and the second touch sensor metal TSM_L2 are not electrically connected and are insulated from each other.

Referring to FIG. 10, in each area of the plurality of unit electrodes (A1, A2, B1-B4, C3, C4, D1, E1, a3, a4, b1-b4, c1, c2, e1, and f1), some of first touch sensor metals TSM_L1 may be electrically connected to second touch sensor metals TSM_L2, and other some, or the other, of the first touch sensor metals TSM_L1 may not be electrically connected to the second touch sensor metals TSM_L2.

For example, in the area of the unit electrode A1, some of the first touch sensor metals TSM_L1 may be electrically connected to the second touch sensor metals TSM_L2, and other some, or the other, of the first touch sensor metals TSM_L1 may not be electrically connected to the second touch sensor metals TSM_L2.

Among the first touch sensor metals TSM_L1, the first touch sensor metals TSM_L1 electrically connected to the second touch sensor metals TSM_L2 may be metals included in the unit electrode A1. Among the first touch sensor metals TSM_L1, the first touch sensor metals TSM_L1 not electrically connected to the second touch sensor metals TSM_L2 may be metals that are not included in the unit electrode A1 and just pass through the unit electrode A1.

That is, among the first touch sensor metals TSM_L1, the first touch sensor metals TSM_L1 electrically connected to the second touch sensor metals TSM_L2 may be metals included in the unit electrode A1 for forming the unit electrode A1. Among the first touch sensor metals TSM_L1, the first touch sensor metals TSM_L1 not electrically connected to the second touch sensor metals TSM_L2 may be metals that are not included in the unit electrode A1 for forming the unit electrode A1, and are included in one or more other first touch electrodes.

Referring to FIG. 10, each of the two or more first unit electrodes (e.g., B1-B4) arranged in the first diagonal direction Dx and electrically connected may include a plurality of first touch sensor metals TSM_L1 and a plurality of second touch sensor metals TSM_L2.

Referring to FIG. 10, among the two or more first unit electrodes (e.g., B1-B4), a specific first touch sensor metal (a TSM_L1 located on the rightmost side in the x-axis direction) among a plurality of first touch sensor metals TSM_L1 included in one first unit electrode (e.g., B1) may be electrically connected to a specific second touch sensor metal (a TSM_L2 located on the lowest portion in the y-axis direction) among a plurality of second touch sensor metals TSM_L2 included in another first unit electrode (e.g., B2) adjacent to the one first unit electrode (e.g., B1) in the first diagonal direction Dx.

Referring to FIG. 10, a first bridge node through which a specific first touch sensor metal (a TSM_L1 located on the rightmost side in the x-axis direction) in an area of one first unit electrode (e.g., B1) and a specific second touch sensor metal (a TSM_L2 located at the lowest portion in the y-axis direction) in an area of another first unit electrode (e.g., B2) are electrically connected may be located in an area of a second unit electrode (e.g., c1) adjacent to the one first unit electrode (e.g., B1) in the y-axis direction. Here, the second unit electrode (e.g., c1) is one of unit electrodes c1-c4 included in a second touch electrode TE_c in the second diagonal direction Dy.

Referring to FIG. 10, each of two or more second unit electrodes (e.g., b1-b4) arranged in the second diagonal direction Dy and electrically connected may include a plurality of first touch sensor metals TSM_L1 and a plurality of second touch sensor metals TSM_L2.

Referring to FIG. 10, among the two or more second unit electrodes (e.g., b1-b4), a specific second touch sensor metal (a TSM_L2 located on the second lowest portion in the y-axis direction) among a plurality of second touch sensor metals TSM_L2 included in one second unit electrode (e.g., b1) may be electrically connected to a specific first touch sensor metal (a TSM_L1 located on the leftmost side in the x-axis direction) among a plurality of first touch sensor metals TSM_L1 included in another second unit electrode (e.g., b2) adjacent to the one second unit electrode (e.g., b1) in the second diagonal direction Dy.

Referring to FIG. 10, a second bridge node through which a specific second touch sensor metal (a TSM_L2 located at the second lowest portion in the y-axis direction) in an area of one second unit electrode (e.g., b1) and a specific first touch sensor metal (a TSM_L1 located on leftmost side in the x-axis direction) in an area of another second unit electrode (e.g., b2) are electrically connected may be located in an area of a first unit electrode (e.g., A2) adjacent to the one second unit electrode (e.g., b1) in the x-axis direction. Here, the first unit electrode (e.g., A2) is one of unit electrodes A1-A4 included in a first touch electrode TE_A in the first diagonal direction Dx.

Referring to FIG. 11, for example, in a situation where a liquid crystal display panel is applied as the display panel 210, a transistor TR and a pixel electrode PXL may be disposed in an area of a first sub-pixel SP1 of a plurality of sub-pixels SP disposed on the display panel 210.

Referring to FIG. 11, a first data line DL1 for transmitting a data voltage to the first sub-pixel SP1 and a gate line GL for carrying a gate signal to the first sub-pixel SP1 may be disposed in an area adjacent to the first sub-pixel SP1. Further, a second data line DL2 for transmitting a data voltage to a sub-pixel SP adjacent to the first sub-pixel SP1 may also be disposed in an area adjacent to the first sub-pixel SP1.

Referring to FIG. 11, when such a liquid crystal display panel is applied as the display panel 210, a common electrode CE is disposed on the display panel 210. In the touch display device 100 according to aspects of the present disclosure, the common electrode CE may be divided into several portions. A common voltage for display driving may be applied to the common electrode CE during a display driving period, and a touch driving signal TDS may be applied during a touch driving period. That is, the common electrode CE can be used as a touch electrode TE during the touch driving period. A size of an area in which one common electrode CE corresponding to one touch electrode TE is disposed corresponds to a size of an area in which two or more sub-pixels SP are disposed. The common electrode CE may be disposed in the area where the first sub-pixel SP1 is disposed.

The common electrode CE may include a first common electrode portion formed of the same material as the pixel electrode PXL and disposed in the same layer as the pixel electrode PXL, and a second common electrode portion formed of the same material as the gate line GL and disposed in the same layer as the gate line GL.

Meanwhile, a first touch line TL1 may be disposed to overlap the area in which the first sub-pixel SP1 is disposed, and may be electrically connected to the touch electrode TE used as the common electrode CE disposed to overlap the first sub-pixel SP1. Here, the first touch line TL1 may be electrically connected to the first common electrode portion or the second common electrode portion of the common electrode CE through a contact hole.

A second touch line TL2 may not be electrically connected to the touch electrode TE overlapping the first sub-pixel SP1 while being disposed to overlap the area in which the first sub-pixel SP1 is disposed.

The first and second touch lines TL1 and TL2 may include the same material (e.g., source and/or drain material(s)) as the data line DL1, and be disposed in a data layer in which the data lines DL1 and DL2 are located.

Meanwhile, referring to FIG. 11, among one or more first touch sensor metal TSM_L1 and one or more second touch sensor metal TSM_L2 included in each unit electrode (A1, A2, B2, b1, b2, or c1), the first touch sensor metal TSM_L1 may include the same material (e.g., source and/or drain material(s)) as the data lines DL1 and DL2 for display driving and be disposed in the data layer in which the data lines DL1 and DL2 are located.

Referring to FIG. 11, among one or more first touch sensor metal TSM_L1 and one or more second touch sensor metal TSM_L2 included in each unit electrode (A1, A2, B2, b1, b2, or c1), the second touch sensor metal TSM_L2 may include the same material (gate material) as the gate lines GL for the display driving and be disposed in the same layer (gate layer) as the gate line GL.

Figure 12:
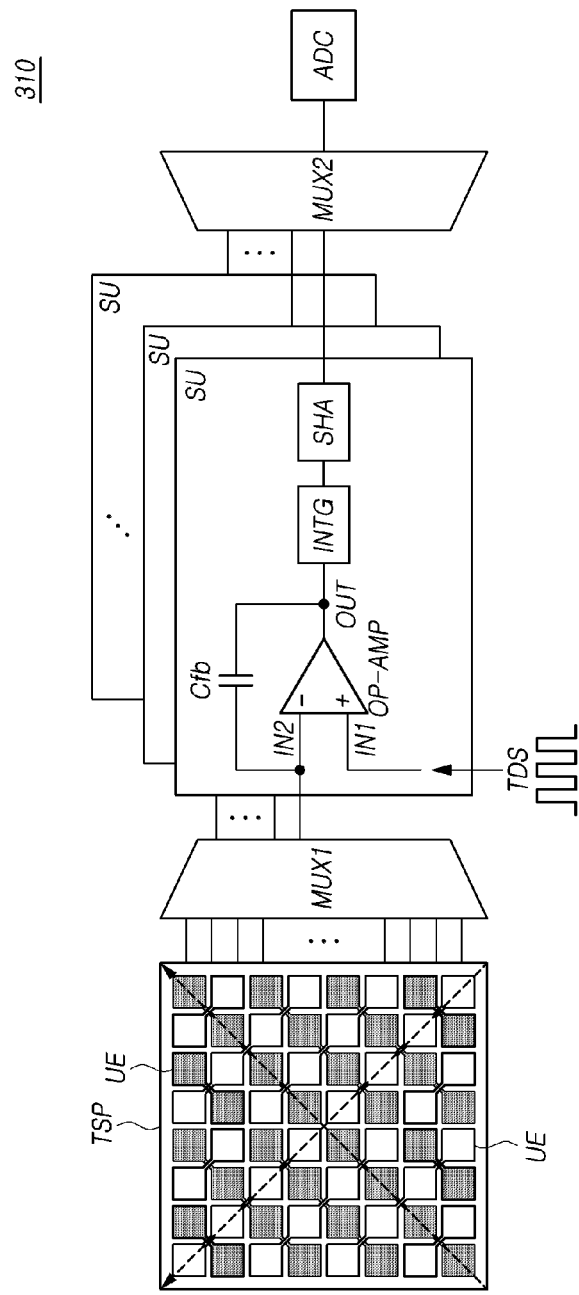
FIG. 12 illustrates a touch driving circuit of the touch display device according to aspects of the present disclosure.
Figure 13:
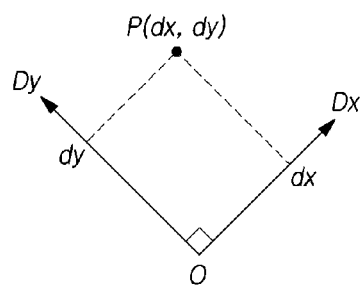
FIG. 13 illustrates a touch coordinate system of the touch display device according to aspects of the present disclosure.

FIG. 12 illustrates a touch driving circuit 310 of the touch display device 100 according to aspects of the present disclosure. FIG. 13 illustrates a touch coordinate system of the touch display device 100 according to aspects of the present disclosure.

Referring to FIG. 12, the touch driving circuit 310 may include a first multiplexer circuit MUX1, a plurality of sensing units SU, a second multiplexer circuit MUX2, and one or more analog-to-digital converters ADC.

The first multiplexer circuit MUX1 may include a plurality of multiplexers. The number of the plurality of multiplexers may correspond to the number of touch electrodes TE that can be simultaneously sensed. Here, each of the touch electrodes TE may include two or more unit electrodes UE arranged in a first diagonal direction Dx or a second diagonal direction Dy and electrically connected to one another.

The plurality of multiplexers included in the first multiplexer circuit MUX1 may be connected to and correspond to the plurality of sensing units SU, respectively.

The second multiplexer circuit MUX2 can select one of the plurality of sensing units SU and connect the selected sensing unit SU to the analog-to-digital converter ADC. Thus, the analog-to-digital converter ADC can convert a signal output from the selected sensing unit SU, which has been obtained by the sensing of the selected sensing unit SU for the corresponding touch electrode TE, into a digital sensing value.

The touch driving circuit 310 can transmit sensing data including the digital sensing value converted by the analog-to-digital converter ADC to the touch controller 320.

Referring to FIG. 12, the sensing unit SU may include a preamplifier Pre-AMP, an integrator INTG, a sample and hold circuit SHA, and the like.

The preamplifier Pre-AMP may include an operational amplifier OP-AMP including a first input terminal IN1 to which a touch driving signal TDS is input, a second input terminal IN2 electrically connected to a touch line TL selected by a first multiplexer circuit MUX1, and an output terminal OUT from which an output signal is output, and a feedback capacitor Cfb connected between the second input terminal IN2 and the output terminal OUT of the operational amplifier OP-AMP.

In the preamplifier Pre-AMP, the touch driving signal TDS input to the first input terminal IN1 may also be applied to the second input terminal IN2 through an inside path of the operational amplifier OP-AMP. Accordingly, the touch driving signal TDS may be applied to the touch line TL electrically connected to the second input terminal IN2. A touch driving signal TDS applied to the touch line TL may also be applied to a touch electrode TE connected to the touch line TL.

The preamplifier Pre-AMP can receive a touch sensing signal from the touch electrode TE to which the touch driving signal TDS is supplied. Charge can be stored in the feedback capacitor Cfb by the received touch sensing signal.

The integrator INTG can integrate an output signal output from the preamplifier and output a value resulting from the integrating. The integrator INTG may be implemented separately from the preamplifier Pre-AMP, or may be integrated with the preamplifier Pre-AMP.

The sample and hold circuit SHA can store the integral value output from the integrator INTG. When a corresponding sensing unit SU is selected by the second multiplexer circuit MUX2, the integral value stored in the sample and hold circuit SHA may be input to the analog-to-digital converter ADC.

Meanwhile, a parasitic capacitance may be formed between a touch electrode TE, which is a target to be sensed, and another touch electrode TE, which is not the sensing target. Such parasitic capacitance may degrade touch sensitivity.

Accordingly, the touch display device 100 according to aspects of the present disclosure may perform load-free driving capable of reducing parasitic capacitance.

When the touch display device 100 according to aspects of the present disclosure performs the load-free driving, while a touch driving signal TDS is output to a touch line TL connected to a target touch electrode TE required to be sensed, the touch driving circuit 310 can output a load-free driving signal corresponding to the touch driving signal TDS to all, or one or more, of the remaining touch lines TL except for the touch line TL to which the touch driving signal TDS is applied.

As a result, while the touch driving signal TDS is output to the touch electrode TE required to be sensed, the load-free driving signal corresponding to the touch driving signal TDS may be applied to one or more remaining touch electrodes.

The signal characteristics of such a load-free driving signal may correspond to the signal characteristics of the touch driving signal TDS. For example, an amplitude AV of the load-free driving signal may be the same as an amplitude AV of the touch driving signal TDS, a frequency of the load-free driving signal may be the same as a frequency of the touch driving signal TDS, or a phase of the load-free driving signal may be the same as a phase of the touch driving signal TDS.

Accordingly, it is possible to prevent a parasitic capacitance from being formed between the touch electrode TE required to be sensed, and another touch electrode TE not required to be sensed, and thereby, the touch sensitivity can be improved.

When the touch display device 100 according to aspects of the present disclosure performs the load-free driving, while a touch driving signal TDS is output to a touch line TL connected to a target touch electrode TE required to be sensed, the data driving circuit 220 can output a load-free driving signal corresponding to the touch driving signal TDS to all, or one or more, of data lines DL.

When the touch display device 100 according to aspects of the present disclosure performs the load-free driving, while a touch driving signal TDS is output to a touch line TL connected to a target touch electrode TE required to be sensed, the gate driving circuit 230 can output a load-free driving signal corresponding to the touch driving signal TDS to all, or one or more, of gate lines GL.

The signal characteristics of the load-free driving signal applied to the data line DL and/or the gate line GL may correspond to the signal characteristics of the touch driving signal TDS. For example, an amplitude AV of the load-free driving signal may be the same as an amplitude AV of the touch driving signal TDS, a frequency of the load-free driving signal may be the same as a frequency of the touch driving signal TDS, or a phase of the load-free driving signal may be the same as a phase of the touch driving signal TDS.

When display driving is not performed while touch sensing is in progress, the load-free driving signal applied to the gate line GL may be synchronized with the touch driving signal TDS whose voltage level is changed, and thus, even when its voltage level swings, the load-free driving signal that swings in a range of a turn-off level voltage can turn off a transistor connected to the gate line GL.

Meanwhile, the touch display device 100 according to aspects of the present disclosure can divide one frame time into one or more display periods and one or more touch periods, perform display driving during the display period, and perform touch sensing during the touch period not overlapping the display period.

In another embodiment, the touch display device 100 according to aspects of the present disclosure may simultaneously perform display driving and touch sensing for at least a part of one frame time.

The touch driving circuit 310 of the touch sensing circuit 300 of the touch display device 100 according to aspects of the present disclosure can transmit a touch driving signal TDS whose voltage level varies to at least one of a plurality of first touch lines (TL_A-TL_J) and a plurality of second touch lines (TL_a-TL_j).

The touch driving circuit 310 of the touch sensing circuit 300 can generate and output touch sensing data based on a touch sensing signal received from the first touch lines (TL_A-TL_J) to which a touch driving signal TDS is applied and a touch sensing signal received from the second touch lines (TL_a-TL_j) to which the touch driving signal TDS is applied.

Referring to FIG. 13, the touch controller 320 of the touch sensing circuit 300 can detect a coordinate value dx in the first diagonal direction Dx and a coordinate value dy in the second diagonal direction Dy based on touch sensing data, and determine touch coordinates P (dx, dy).

According to the embodiments described herein, the touch display device 100 will be briefly described once again as follows.

According to the embodiments described herein, the touch display device 100 may include a substrate SUB, a pad portion 400 disposed in an edge of the substrate SUB, a plurality of unit electrodes UE arranged in a matrix form, and a plurality of touch lines TL electrically connecting one or more of the plurality of unit electrodes UE to the pad portion 400.

The plurality of unit electrodes UE may be connected to form a plurality of first touch electrodes (TE_A-TE_J) disposed in a first direction Dx and a plurality of second touch electrodes (TE_a-TE_j) disposed in a second direction Dy.

Each of the plurality of first touch electrodes (TE_A-TE_J) may include two or more first unit electrodes UE that are arranged in the first direction and are electrically connected, and each of the plurality of second touch electrodes (TE_a-TE_j) may include two or more second touch electrodes UE that are arranged in the second direction and are electrically connected.

A plurality of touch lines TL may include a plurality of first touch lines (TL_A-TL_J) corresponding to the plurality of first touch electrodes (TE_A-TE_J) and a plurality of second touch lines (TL_a-TL_j) corresponding to the plurality of second touch electrodes (TE_a-TE_j).

Each of the plurality of first touch lines (TL_A-TL_J) can electrically connect the pad portion 400 to one representative first unit electrode UE of two or more first unit electrodes UE included in a corresponding first touch electrode (one of TE_A-TE_J).

Each of the plurality of second touch lines (TL_a-TL_j) can electrically connect the pad portion 400 to one representative second unit electrode UE of two or more second unit electrodes UE included in a corresponding second touch electrode (one of TE_a-TE_j).

Each of the plurality of first touch lines (TL_A-TL_J) may overlap one or more second unit electrodes UE, or each of the plurality of second touch lines (TL_a-TL_j) may overlap one or more first unit electrodes UE.

Each of the plurality of first touch lines (TL_A-TL_J) and the plurality of second touch lines (TL_a-TL_j) may be disposed in a third direction different from the first and second directions.

An angle between the first direction (e.g., the first diagonal direction) and the third direction (e.g., the y-axis direction) may be greater than 0 degree and smaller than 90 degrees, and an angle between the second direction (e.g., the second diagonal direction) and the third direction (e.g., the y-axis direction) may be greater than 90 degrees and smaller than 180 degrees.

In another embodiment, an angle between the first direction (e.g., the first diagonal direction) and the third direction (e.g., the y-axis direction) may be greater than 90 degree and smaller than 180 degrees, and an angle between the second direction (e.g., the second diagonal direction) and the third direction (e.g., the y-axis direction) may be greater than 0 degree and smaller than 90 degrees.

According to the embodiments described herein, it is possible to provide touch display devices 100 having a touch sensor structure capable of reducing the number of touch lines TL and touch channels TCH.

According to the embodiments described herein, it is possible to provide touch display devices 100 having a touch sensor structure capable of improving transmittance of a display panel by reducing the number of touch electrodes when the touch panel TSP is embedded in the display panel 210.

According to the embodiments described herein, it is possible to provide touch display devices 100 capable of displaying uniform images by enabling a substantial equal parasitic capacitance to be formed through a gate line or a data line for each touch electrode.

The embodiments of the present disclosure described above have been described for illustrative purposes; those skilled in the art will appreciate that various modifications, additions and substitutions are possible, without departing from the scope and spirit of the invention as disclosed in the accompanying claims. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display device comprising:
    a substrate;
    a pad portion disposed in an edge of the substrate;
    a plurality of unit electrodes arranged in a matrix form; and
    a plurality of touch lines electrically connecting one or more of the plurality of unit electrodes to the pad portion,
    wherein the plurality of unit electrodes are connected to form a plurality of first touch electrodes arranged in a first diagonal direction, and a plurality of second touch electrodes arranged in a second diagonal direction intersecting the first diagonal direction, and each of the plurality of first touch electrodes includes two or more first unit electrodes arranged in the first diagonal direction and electrically connected, and each of the plurality of second touch electrodes includes two or more second unit electrodes arranged in the second diagonal direction and electrically connected,
    wherein the plurality of touch lines include a plurality of first touch lines corresponding to the plurality of first touch electrodes and a plurality of second touch lines corresponding to the plurality of second touch electrodes, and each of the plurality of first touch lines electrically connects the pad portion to one representative first unit electrode of the two or more first unit electrodes included in a corresponding first touch electrode, and each of the plurality of second touch lines electrically connects the pad portion to one representative second unit electrode of the two or more second unit electrodes included in a corresponding second touch electrode, and
    wherein each of the plurality of first touch lines overlaps one or more of the second unit electrodes, or each of the plurality of second touch lines overlaps one or more of the first unit electrodes.

2. The touch display device according to claim 1, wherein each of the plurality of first touch lines and the plurality of second touch lines is arranged to extend in a direction different from the first and second diagonal directions, and each of the plurality of first touch lines overlaps one or more of the second unit electrodes located between the connected representative first unit electrode and the pad portion, and each of the plurality of second touch lines overlaps one or more of the first unit electrodes located between the connected representative second unit electrode and the pad portion.

3. The touch display device according to claim 1, wherein the two or more first unit electrodes included in each of the plurality of first touch electrodes have different distances from the pad portion, and the two or more second unit electrodes included in each of the plurality of second touch electrodes have different distances from the pad portion.

4. The touch display device according to claim 1, wherein a bridge portion between the two or more first unit electrodes included in each of the plurality of first touch electrodes crosses a bridge portion between the two or more second unit electrodes included in a second touch electrode intersecting the corresponding first touch electrode.

5. The touch display device according to claim 1, wherein a shape of each of the plurality of unit electrodes is a rectangle or a square.

6. The touch display device according to claim 5, wherein when the shape of each of the plurality of unit electrodes is the square, and touch sensing resolution in the first diagonal direction and the second diagonal direction is k, in each of the plurality of unit electrodes, a diagonal length is k.

7. The touch display device according to claim 5, wherein each of the plurality of first touch electrodes includes p first unit electrodes continuously arranged on a straight line in the first diagonal direction and electrically connected to one another, and each of the plurality of second touch electrodes includes p second unit electrodes continuously arranged on a straight line in the second diagonal direction and electrically connected to one another, and wherein when the shape of each of the plurality of unit electrodes is the square, and an area of each of the plurality of first touch electrodes and the plurality of second touch electrodes is S, in each of the plurality of unit electrodes, a diagonal length is $(2S/p)^{(1/2)}$.

8. The touch display device according to claim 1, wherein each of the plurality of unit electrodes includes touch sensor metals patterned in a mesh form.

9. The touch display device according to claim 1, wherein each of the plurality of unit electrodes includes one or more first touch sensor metals and one or more second touch sensor metals electrically connected to each other, and the one or more first touch sensor metals and the one or more second touch sensor metals cross each other and are located in different layers from each other.

10. The touch display device according to claim 9, wherein one of the first touch sensor metal and the second touch sensor metal extends in a horizontal direction, and the other of the first touch sensor metal and the second touch sensor metal extends in a vertical direction.

11. The touch display device according to claim 9, wherein each of the two or more first unit electrodes includes a plurality of first touch sensor metals and a plurality of second touch sensor metals, and among the two or more first unit electrodes, a specific first touch sensor metal among a plurality of first touch sensor metals included in one first unit electrode is electrically connected to a specific second touch sensor metal among a plurality of second touch sensor metals included in another first unit electrode adjacent to the one first unit electrode in the first diagonal direction.

12. The touch display device according to claim 11, wherein a first bridge node at which the specific first touch sensor metal and the specific second touch sensor metal are electrically connected, is located in an area of a second unit electrode adjacent to the one first unit electrode.

13. The touch display device according to claim 9, wherein each of the two or more second unit electrodes includes a plurality of first touch sensor metals and a plurality of second touch sensor metals, and among the two or more second unit electrodes, a specific second touch sensor metal among a plurality of second touch sensor metals included in one second unit electrode is electrically connected to a specific first touch sensor metal among a plurality of first touch sensor metals included in another second unit electrode adjacent to the one second unit electrode in the second diagonal direction.

14. The touch display device according to claim 13, wherein a second bridge node at which the specific second touch sensor metal and the specific first touch sensor metal are electrically connected, is located in an area of a first unit electrode adjacent to the one second unit electrode.

15. The touch display device according to claim 9, wherein the one or more first touch sensor metals include a same material as a data line for display driving, and wherein the one or more second touch sensor metals include a same material as a gate line for the display driving.

16. The touch display device according to claim 1, wherein the plurality of unit electrodes include three or more first unit electrodes arranged in the first diagonal direction and electrically connected, three or more second unit electrodes arranged in the second diagonal direction and electrically connected, two first unit electrodes arranged in the first diagonal direction and electrically connected, and two second unit electrodes arranged in the second diagonal direction and electrically connected.

17. The touch display device according to claim 16, wherein the two first unit electrodes arranged in the first diagonal direction and electrically connected, and the two second unit electrodes arranged in the second diagonal direction and electrically connected are located in an edge.

18. The touch display device according to claim 1, further comprising a touch sensing circuit configured to output a touch driving signal whose voltage level is changed to at least one of the plurality of first touch lines and the plurality of second touch lines, wherein the touch sensing circuit is configured to detect a first coordinate value in the first diagonal direction and a second coordinate value in the second diagonal direction based on a first signal received from a first touch line to which the touch driving signal is applied and a second signal received from a second touch line to which the touch driving signal is applied.

19. A touch display device comprising:

a substrate;

a pad portion disposed in an edge of the substrate;

a plurality of unit electrodes arranged in a matrix form; and a plurality of touch lines electrically connecting one or more of the plurality of unit electrodes to the pad portion, wherein the plurality of unit electrodes are connected to form a plurality of first touch electrodes arranged in a first direction, and a plurality of second touch electrodes arranged in a second direction intersecting the first direction, and each of the plurality of first touch electrodes includes two or more first unit electrodes arranged in the first direction and electrically connected, and each of the plurality of second touch electrodes includes two or more second unit electrodes arranged in the second direction and electrically connected, wherein the plurality of touch lines include a plurality of first touch lines corresponding to the plurality of first touch electrodes and a plurality of second touch lines corresponding to the plurality of second touch electrodes, and each of the plurality of first touch lines electrically connects the pad portion to one representative first unit electrode of two or more first unit electrodes included in a corresponding first touch electrode, and each of the plurality of second touch lines electrically connects the pad portion to one representative second unit electrode of two or more second unit electrodes included in a corresponding second touch electrode, and wherein each of the plurality of first touch lines and the plurality of second touch lines is arranged in a third direction different from the first direction and the second direction, and an angle between the first direction and the third direction is greater than 0 degree and smaller than 90 degrees, and an angle between the second direction and the third direction is greater than 90 degrees and smaller than 180 degrees, or the angle between the first direction and the third direction is greater than 90 degree and smaller than 180 degrees, and the angle between the second direction and the third direction is larger than 0 degree and smaller than 90 degrees.

20. The touch display device according to claim 19, wherein each of the plurality of first touch lines overlaps one or more of the second unit electrodes, or each of the plurality of second touch lines overlaps one or more of the first unit electrodes.

* * * * *